(12) United States Patent
Yasohara

(10) Patent No.: US 6,512,343 B1
(45) Date of Patent: Jan. 28, 2003

(54) MOTOR DRIVER

(75) Inventor: Masahiro Yasohara, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/032,855

(22) Filed: Dec. 27, 2001

(30) Foreign Application Priority Data

Dec. 27, 2000 (JP) ......................................... 2000-397678

(51) Int. Cl.[7] .............................................. H02K 23/16
(52) U.S. Cl. ....................... 318/437; 318/138; 318/254; 318/434
(58) Field of Search ................................. 318/437, 254, 318/434, 138

(56) References Cited

U.S. PATENT DOCUMENTS

| | | | |
|---|---|---|---|
| 3,898,544 A | * 8/1975 | Tanikoshi | 318/138 |
| 5,097,192 A | * 3/1992 | Iijima | 318/599 |
| 5,637,998 A | * 6/1997 | Kushihara | 324/207.16 |
| 5,838,128 A | 11/1998 | Maiocchi et al. | 318/439 |
| 6,023,417 A | 2/2000 | Hava et al. | 363/41 |
| 6,084,376 A | * 7/2000 | Piedl et al. | 318/254 |
| 6,163,118 A | 12/2000 | Chen et al. | 318/254 |
| 6,211,633 B1 | * 4/2001 | Jones et al. | 318/138 |
| 6,236,174 B1 | * 5/2001 | White | 318/138 |
| 6,389,373 B1 | * 5/2002 | Ohya | 347/116 |

FOREIGN PATENT DOCUMENTS

| | | |
|---|---|---|
| EP | 0 068 756 | 1/1983 |
| EP | 0 954 090 | 11/1999 |
| JP | A-H1-126191 | 5/1989 |
| WO | WO 93/26075 | 12/1993 |

* cited by examiner

*Primary Examiner*—Rita Leykin
(74) *Attorney, Agent, or Firm*—Ratner Prestia

(57) ABSTRACT

A motor driver includes a driving waveform generator simply constructed. Because the generator produces a waveform having rather small numbers of steps divided and voltage levels divided. Respective phase-driving signals responsive to a step-like voltage waveform produced by the generator are applied to a power feeder, so that an alternate current—shaping in a sine wave and changing sequentially—runs through respective phase-coils. Further, phase-advancing control realizes phase agreement between respective phase-currents and back electromotive force generated each of the respective phases. As a result, a motor can be driven efficiently with less torque ripples, vibrations and noises.

24 Claims, 22 Drawing Sheets

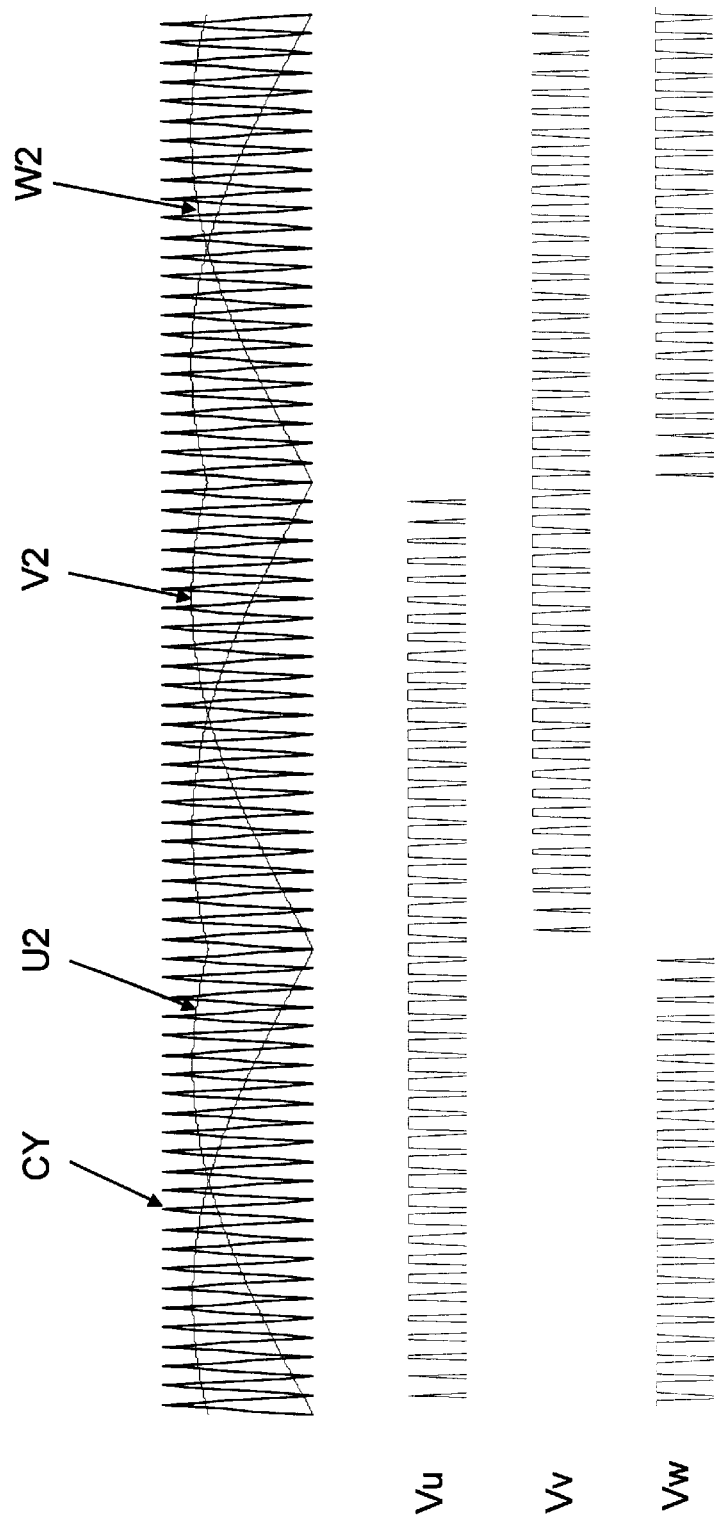

MOTOR DRIVER

TECHNICAL FIELD

The present invention relates to a motor driver suitable for driving a brushless DC motor built in, e.g., an air conditioner, a water heater, an air cleaner, and an information apparatus such as a copying machine, a printer and the like. More particularly, relates it to an efficient motor driver through which alternate current changing sequentially runs, thereby reducing torque ripples, vibrations and noises in activating the motor. Sine-wave current is preferred to the alternate current.

BACKGROUND ART

DC brushless motors have been widely used as driving motors built in, e.g., an air conditioner and an information apparatus including a copying machine, a printer and the like because of their advantages such as a long service-life, high reliability, and easiness of speed control.

FIG. 21 is a circuit diagram of a conventional motor driver. FIG. 22 shows waveforms at respective sections of the driver with respect to a rotating angle (electric angle) of the motor when a voltage of a rectangular waveform is applied to the motor driving coils of the driver.

As shown in FIG. 21, in a driver of a brushless DC motor (hereinafter simply referred to as a motor), a rotor position is detected by a plurality of position detectors 901, 903 and 905 comprising a Hall effect device. Three-phase distributor 890 receives position signals Hu, Hv and Hw, and outputs three-phase distribution signals U0, V0 and W0 to pulse-width modulating (PWM) comparator 840. At this time, signals U0, V0 and W0 shape in one-step signals different from each other by 120 degree in electrical angles as shown in FIG. 22. Comparator 840 outputs a signal which controls, via gate driver 830, six switches constituting power-feeder 820 sequentially to be turned ON or OFF. Power supplied to three-phase coils 811, 813 and 815 is thus switched in sequence responsive to a rotor position, thereby spinning the motor.

A voltage—applied between a coil end of phase U and neutral point N—shapes in a rectangular waveform signal as shown at U-N in FIG. 2. Signals in rectangular waveforms similar to this are applied to phase V and phase W. Changing a current in the three-phase coils causes sharp ON-OFF switches responsive to the rectangular waveform signals. As a result, coils are vibrated, mechanical noises and electrical noises are produced.

A motor driver, which lowers noises and electric noises discussed above, is disclosed in Japanese Patent No. 2658085. This motor driver uses detection output from a detecting element which detects main magnetic-field for driving, and an address signal formed of pulses having frequencies higher than that of the output of the detecting element, whereby a driving waveform stored in a memory is read out for driving the motor. This structure eliminates a frequency generator (FG) and a detecting element (PG) to be simplified. The FG has a constant number of pulses per rotation of the rotor as well as a frequency varying responsive to an r.p.m. of the rotor, and the PG detects magnetic flux from a permanent magnet disposed at given places on the outer wall of the rotor.

The conventional motor driver discussed above, however, requires a memory storing a predetermined driving waveform and a digital-analog (D/A) converter which reads out the driving waveform (digital signal) before converting the digital signal into an analog signal for driving the motor. Therefore, the conventional motor driver needs a complicated circuit.

Further, in the conventional motor driver discussed above, the driving waveform with respect to a rotational position of the rotor, namely, a voltage waveform applied to the coils of respective phases, is uniquely determined by digital-signal data stored in the memory discussed above. Thus, in the case where the driver drives a motor having a rather large inductance, e.g., a stator iron core is wounded with coils, a phase delay of current of respective phases with respect to the voltages applied to the respective phases becomes larger when the driving waveform is applied to the respective phases. As a result, efficiency of the motor is lowered.

SUMMARY OF THE INVENTION

The present invention addresses the problem discussed above, and aims to provide a simply structured and efficient motor-driver which can reduce torque ripples, vibrations and noises of a motor.

The motor driver of the present invention comprises the following elements:
(a) driving coils for three phases;
(b) a power feeder, connected to a dc power supply, for powering the coils of the respective phases;
(c) a position detector for detecting a mover position with respect to the respective phases;
(d) a positional signal interpolator, disposed for at least one of the phases, for dividing one cycle in electrical angles of a positional signal of at least one phase into 3n×4 cycles ("n" is an integer equal to or more than "1"), where the positional signal is produced by an output from the position detector; and
(e) a driving-waveform generator for receiving a dividing address-signal from the interpolator, producing a step-waveform for each of three phases where the step-waveform has a voltage level (not exceeding the steps of 3n+1) preset corresponding to respective addresses of the address signal, and outputting the step-waveforms in voltages.

A driving signal for each of the respective phases, corresponding to the step-waveforms for three phases, is applied to the power feeder, thereby driving the motor with an alternate current which changes respective phase-coils sequentially.

The motor driver of the present invention can be equipped with three positional-signal interpolators, three driving-waveform generators for the three phases individually, in other words, the motor driver comprises the following elements:

A motor driver comprising the following elements:
(a) driving coils for three phases;
(b) a power feeder, connected to a dc power supply, for powering the coils of the respective phases;
(c) a position detector for detecting a mover position with respect to the respective phases;
(d) positional signal interpolators, disposed for each of the phases, for dividing one cycle in electrical angles of respective phase-positional-signals produced by outputs from the position detector into 3n×4 cycles ("n" is an integer equal to or more than "1"); and
(e) driving-waveform generators, disposed for each of the respective phases, for receiving a dividing address-signal from each of the interpolators, producing a step-waveform for each of three phases where the step-waveform has a voltage level (not exceeding the steps of 3n+1) preset corresponding to respective addresses of the address signal, and outputting the step-waveforms voltages.

A driving signal for each of respective phases, corresponding to each step of the step-waveforms, is applied to the power feeder, thereby driving the motor with an alternate current which changes respective phase-coils sequentially.

This structure allows the motor driver not only to reduce torque ripples at starting a motor, vibrations and noises, but also to drive the motor in an efficient manner.

BRIEF DESCRIPTION OF THE DRAWINGS

FIG. 3 illustrates how the voltages—applied to the respective phases—undergo a pulse-width modification (PWM).

DETAILED DESCRIPTION OF THE EXEMPLARY EMBODIMENTS

Exemplary embodiments of the present invention are demonstrated hereinafter with reference to the accompanying drawings.

First Exemplary Embodiment

Figure 1:
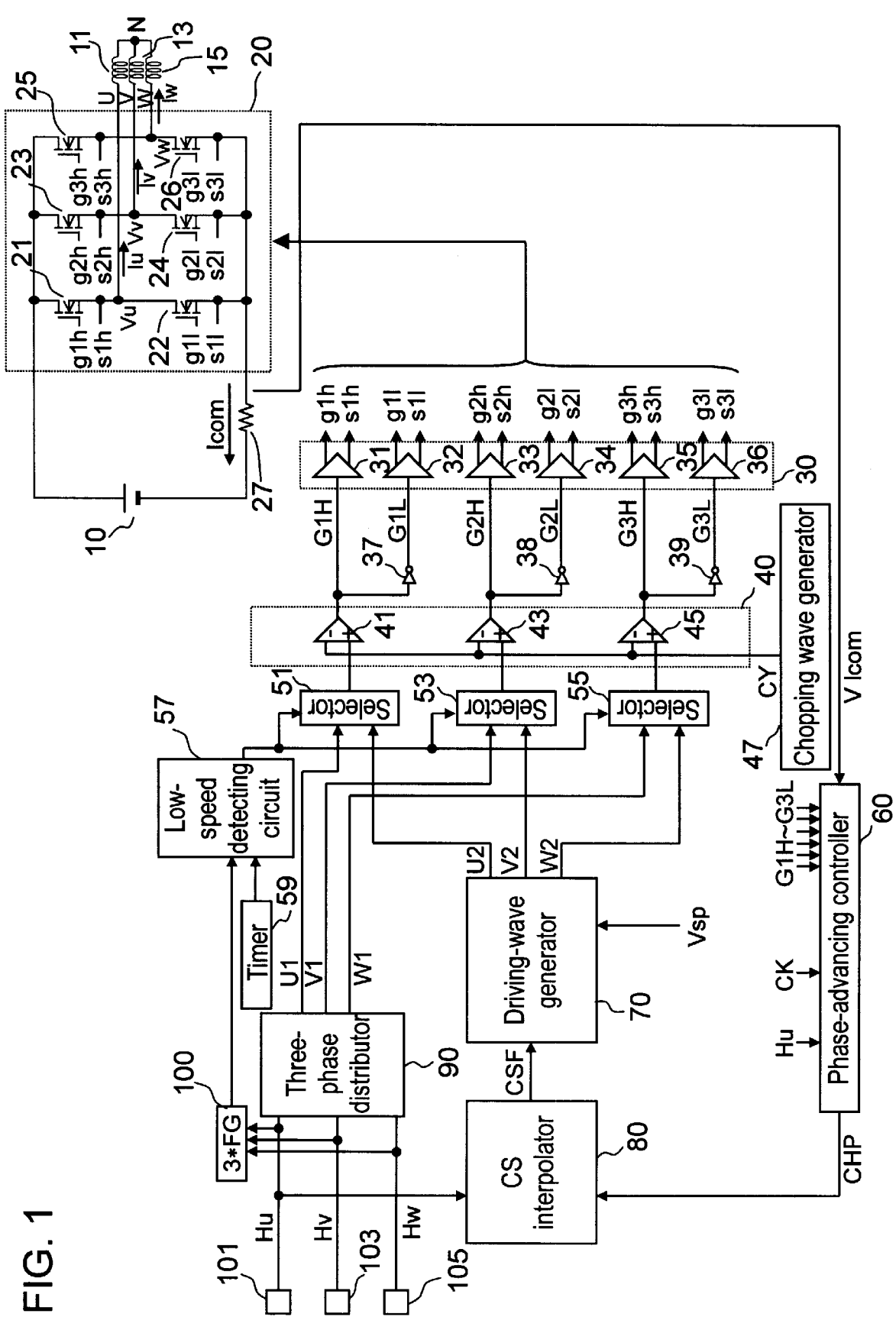
FIG. 1 is a circuit diagram of a motor driver in accordance with a first exemplary embodiment of the present invention.
Figure 2B:
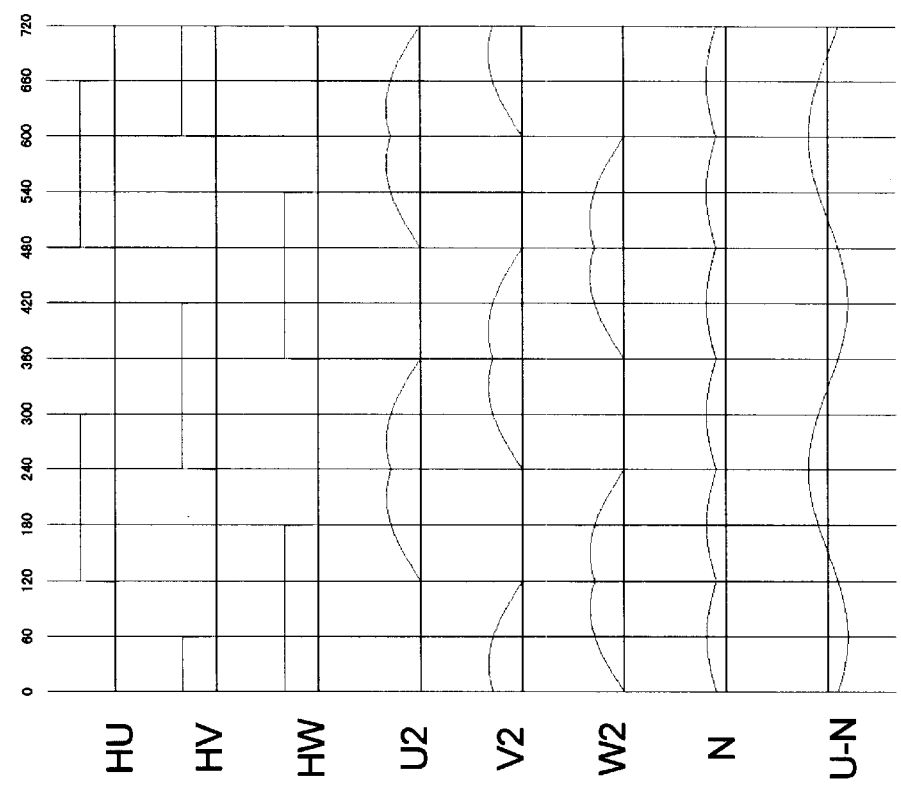
FIG. 2B shows signal-waveforms of respective sections in the motor driver with respect to a rotational angle of the motor at regular spin.
Figure 2A:
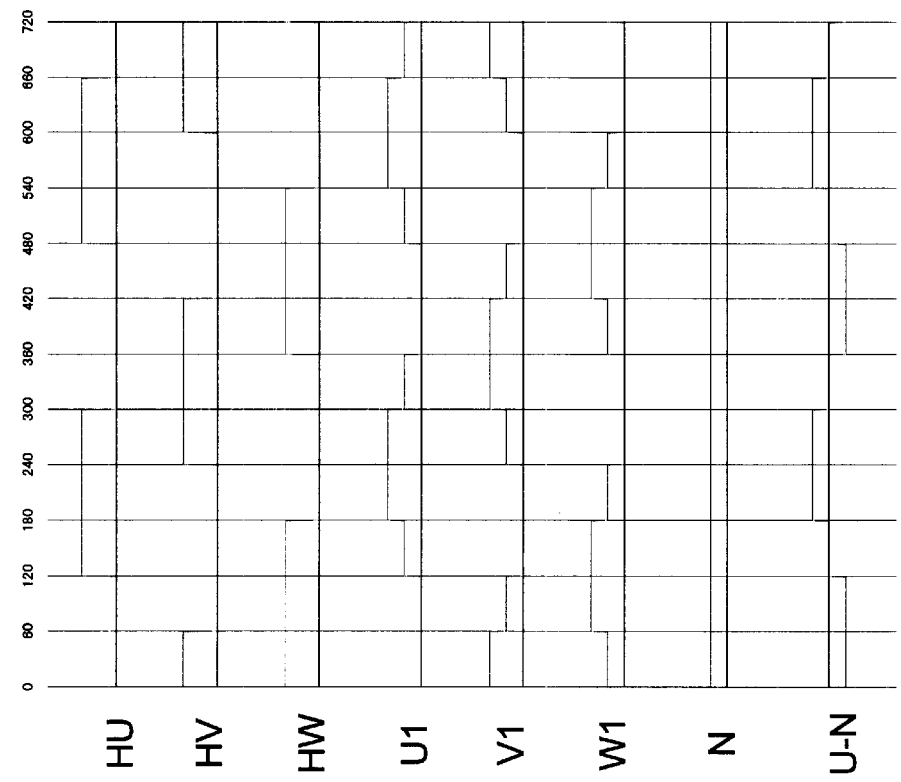
FIG. 2A shows waveforms with respect to a rotational angle (electrical angle) of respective sections in the motor driver when a voltage of a rectangular waveform is applied to respective phases from starting to a low speed driving.

FIG. 1 is a circuit diagram of a motor driver in accordance with the first exemplary embodiment of the present invention. FIG. 2A shows waveforms with respect to a rotational angle (electrical angle) of respective sections when a voltage of a rectangular waveform is applied to respective phases from starting to a low-speed driving in the motor driver. FIG. 2B shows signal-waveforms with respect to a rotational angle of the motor at regular spin in the motor driver. FIG. 3 illustrates how the voltages-applied to the respective phases—undergo a pulse-width modification (PWM.

In FIG. 1, driving coils 11, 13 and 15 for the three phases including phases U, V and W, are connected to power feeder 20 in the following manner. Power feeder 20 comprises an upper arm and a lower arm. The upper arm includes field-effect transistors (FET) 21, 23 and 25, and the lower arm includes transistors 22, 24 and 26. A first terminal of phase U coil 11 is connected to a junction point of transistors 21 and 22, and a first terminal of phase V coil 13 is connected to a junction point of transistors 23 and 24. A first terminal of phase W coil 15 is connected to a junction point of transistors 25 and 26. Respective second terminals of phase U coil 11, phase V coil 13 and phase W coil 15 are connected to each other, thereby forming neutral point N.

Direct-current power supply 10 connects power feeder 20 between a positive feeder terminal and a negative feeder terminal, thereby powering the three-phase coils via power feeder 20. On a feeder line between the negative feeder terminal of power supply 10 and power feeder 20, common-current detecting resistor 27 is placed for detecting common-current "Icom" running through the feeder line.

Position detectors 101, 103 and 105 are formed of a Hall element or a Hall IC, and detect positions of the mover with respect to respective phases 11, 13 and 15. (The mover is not shown in the drawings. "Mover" is a generic term, and a rotational motor has a rotor while a linear motor has a mover. Hereinafter the mover is referred to as a rotor.)

Detectors 101, 103 and 105 output position-detecting signals Hu, Hv and Hw respectively, and signal HU is fed into positional-signal interpolator 80. Interpolator 80 divides one cycle in electrical angles of a position-detecting signal of phase U into 3n×4 cycles ("n" is an integer equal to or more than 1), and outputs a dividing address-signal CSF. Driving waveform generator 70 receives signal CSF and generates a step-waveform for phase U, where the step-waveform has voltage levels predetermined corresponding to respective addresses of signal CSF.

Based on the step-waveform for phase U, generator 70 further generates a step-waveform for phase V and a step-waveform for phase W Each step-waveform has 120 degree phase-difference in electrical angles. Generator 70 outputs step-waveforms U2, V2 and W2—having 120 degree phase-difference in electrical angles with each other—in voltages. When generator 70 generates a step-waveform, the voltage levels predetermined corresponding to respective addresses of signal CSF desirably do not exceed "3n+1" steps. Signal U2 supplied from generator 70 is fed into phase U selector 51, and signal V2 is fed into phase V selector 53, so does signal W2 into phase W selector 55.

On the other hand, three-phase distributor 90 receives positional signals Hu, Hv and Hw having 120 degree phase-difference with each other, and outputs three-phase distributing signals U1, V1 and W1 as shown in FIG. 2A. 3*FG circuit 100 receives signals Hu, Hv and Hw, then synthesizes these signals, and finally supplies a speed signal having a frequency as much as three times that of respective signals to low-speed detecting circuit 57. Timer 59 supplies a time signal to low-speed detecting signal 57. Circuit 57 measures a cycle of the speed signal with timer 59, and instructs selectors 51, 53 and 55 to select signals U1, V1 and W1 tapped off from three-phase distributing circuit 90 until the cycle reaches a given time because the motor speed still stays at a low speed. When the cycle of the speed signal becomes less than the given time, low-speed detecting circuit 57 determines that the motor speed becomes a regular speed, and instructs selectors 51, 53 and 55 to select step-waveforms U2, V2 and W2—the output from generator 70—as shown in FIG. 2B.

Pulse width modulating (PWM) comparator 40 includes comparators 41, 43 and 45. Comparator 41 compares, in voltages, an output from selector 51 with chopping-wave signal CY supplied from chopping-wave generator 47. Comparator 43 compares an output supplied from selector 53 with signal CY in voltages, and comparator 45 compares an output supplied from selector 55 with signal CY in voltages. Chopping-wave signal CY supplied from chopping-wave generator 47 is a carrier signal in terms of PWM, and its frequency ranges from 17 kHz to 20 kHz, which is rather higher than that of an output signal from respective selectors.

Gate driver 30 comprises buffers 31, 32, 33, 34, 35 and 36. Signal G1H supplied from comparator 41 is fed into buffer 31, and at the same time, inverted by inverter 37 as signal G1L before supplied to buffer 32. Signal G2H supplied from comparator 43 is fed into buffer 33, and at the same time, inverted by inverter 38 as signal G2L before supplied to buffer 34. In the same manner, signal G3H supplied from comparator 45 is fed into buffer 35, and at the same time, inverted by inverter 39 as signal G3L before supplied to buffer 36. Respective outputs from buffer 31, 32, 33, 34, 35 and 36 are fed into respective gates of transistors 21, 22, 23, 24, 25 and 26.

Common-current "Icom" running through resistor 27 is detected as a terminal voltage across resistor 27, and detected voltage "Vicom" is fed into phase-advancing controller 60. Output CPH tapped off from controller 60 is fed back to interpolator 80.

An operation of the motor driver discussed above in accordance with the first embodiment is demonstrated hereinafter with reference to FIGS. 2A, 2B and 3. FIG. 2A shows waveforms of respective sections in the motor driver with respect to a rotational angle (electrical angle) from starting the motor to driving the motor at a low speed. Position detectors 101, 103 and 105 are placed so that positional signals HU, HV, HW generate signals having 120 degree phase-difference from each other. Signals HU, HV, HW are synthesized by three-phase distributor 90, and one-step signals U1, V1, W1 are formed as shown in FIG. 2A. Respective phase-driving signals corresponding to signals U1, V1, W1 are applied to power feeder 20. At this time, a voltage at a neutral point of the three-phase coils becomes "N" shown in FIG. 2A, and a voltage across a first terminal of the phase U coil and a second terminal thereof, i.e., neutral point N, draws the waveform U-N shown in FIG. 2A. In the same manner, similar waveforms having 120 degree (electrical angle) phase-difference are drawn for phase V and phase W.

FIG. 2B shows signal-waveforms of respective sections in the motor driver with respect to a rotational angle of the motor at regular spin. If the rotational angles shown in X-axis are expressed in electrical angles, signal HU, HV, HW would be the similar waveforms shown in FIG. 2A. Signal HU is fed into interpolator 80, and undergoes driving-waveform generator 70 to form step-like voltage waveforms such as signal U2, V2, W2 for three-phase as shown in FIG. 2B. As discussed above, respective phase-driving signals corresponding to signals U2, V2, W2 are applied to power feeder 20. At this time, the voltage at the neutral point of the three-phase coils draws a curve "N" shown in FIG. 2B. The voltage applied between a first terminal of phase U coil 11 and a second terminal, i.e., neutral point N draws a curve "U-N" shown in FIG. 2B. In each of phases V and W, the voltage draws the similar curve (not shown) having 120 degree phase-difference. As such, respective alternate currents shaping in sine waves run through three-phase coils, thereby driving the coils.

FIG. 3 illustrates how the voltages-applied to the respective phases—undergo a pulse-width modification (PWM). In FIG. 3, the PWM comparator compares, in voltages, oscillation waveform CY produced by chopping-wave oscillator 47 with step-waveforms U2, V2, W2 of respective phases produced by driving-waveform generator 70. PWM voltage-waveform draws Vu, Vv, Vw shown in FIG. 3, and these voltages are applied to output terminals Vu, Vv, Vw, i.e., the respective first terminals of the three-phase coils, via gate driver 30 and power feeder 20. As such, the three-phase coils are driven by sine-wave currents Iu, Iv, Iw having 120 degree phase-difference from each other. Respective currents running through the three-phase coils can be thus switched smoothly, and three-phase torque synthesized can be uniformed regardless of a rotating angle. As a result, a motor driver generating smaller torque ripple, less vibrations and lower noises is obtainable.

The basic circuit, its operation and advantages in accordance with the first embodiment have been demonstrated hereinbefore. Respective elements of the motor driver are demonstrated specifically hereinafter.

Figure 5:
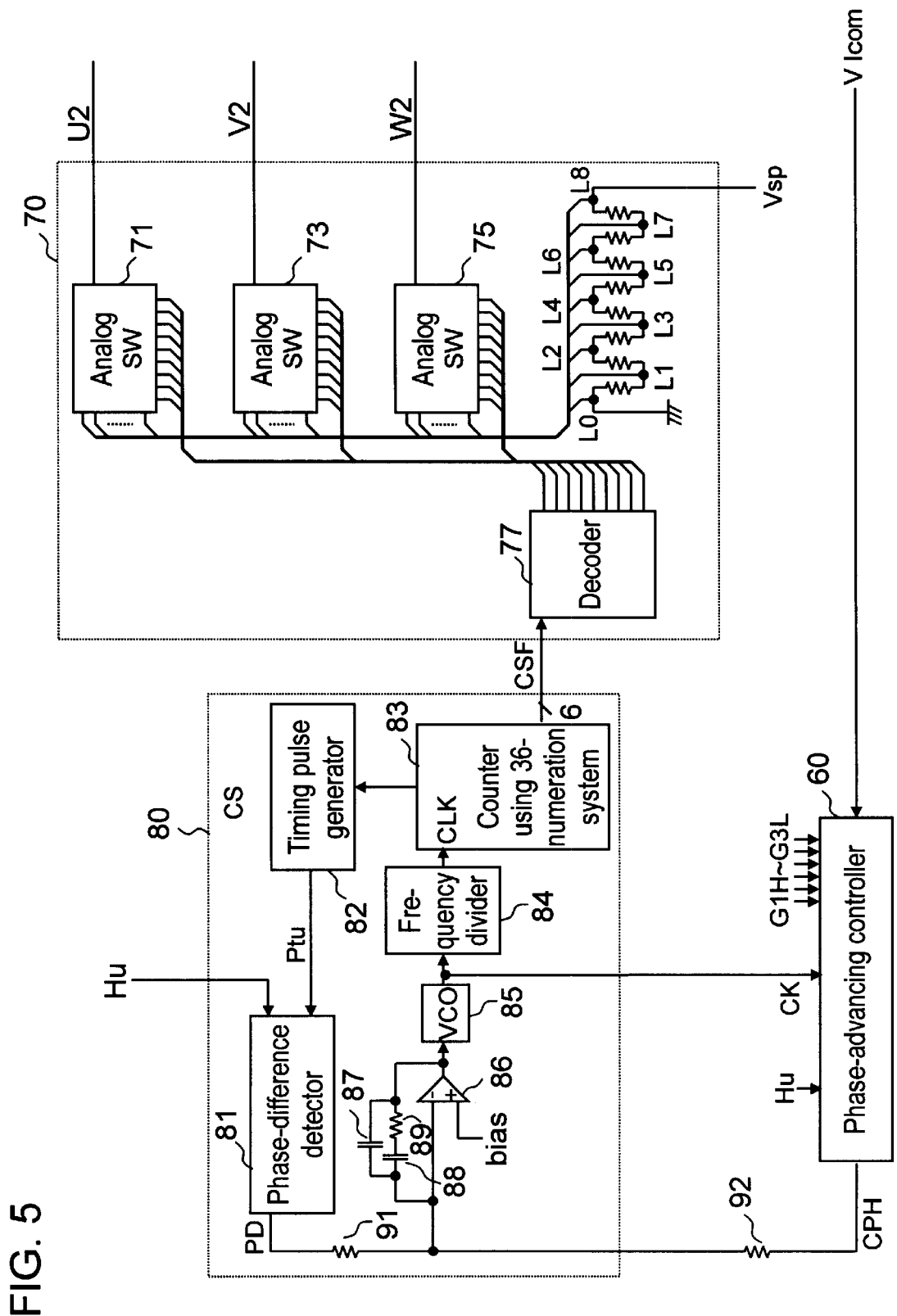
FIG. 5 is a circuit diagram of a main section of the motor driver in accordance with the first and the second embodiments of the present invention.

FIG. 5 is a circuit diagram of a main section of the motor driver in accordance with the first exemplary embodiment of the present invention. In FIG. 5, positional-signal interpolator 80 comprises the following elements and operates as follows:

Phase-difference detector 81 receives positional-signal "Hu" supplied from position detector 101 and timing-pulse "Ptu" supplied from timing-pulse generator 82, and outputs signal "PD" which represents the phase-difference of the two signals. This output signal "PD" from detector 81 is fed into an inverting input-terminal of difference-amplifier 86 via resistor 91. A differential and integral element comprising capacitors 87, 88 and resistor 89 is coupled between the inverting input-terminal and an output-terminal of amplifier 86. A given voltage is applied to a non-inverting input-terminal of amplifier 86. Amplifier 86 converts phase-difference signal PD to a voltage responsive to the phase-difference. Voltage control oscillator 85 oscillates and outputs a frequency signal responsive to a voltage depending on the phase-difference. The oscillated frequency is divided by frequency divider 84. The divided signal is fed into clock terminal CLK of counter 83 using 36-numeration system. Counter 83 counts 0, 1, 2, . . . 35, then return to 0, and repeats this operation. Dividing address-signal CSF divided into 36 steps is fed to driving-waveform generator 70 and timing-pulse generator 82. Waveform generator 70 thus divides one cycle in electrical angles of signal Hu into 3n×4 cycles ("n" is an integer equal to or more than 1, in this embodiment, n=3, thus the one cycle is divided into 36 sections.) Pulse generator 82 generates timing-pulse "Ptu" having a given pulse width, then outputs the pulse to phase-difference detector 81.

Figure 6:
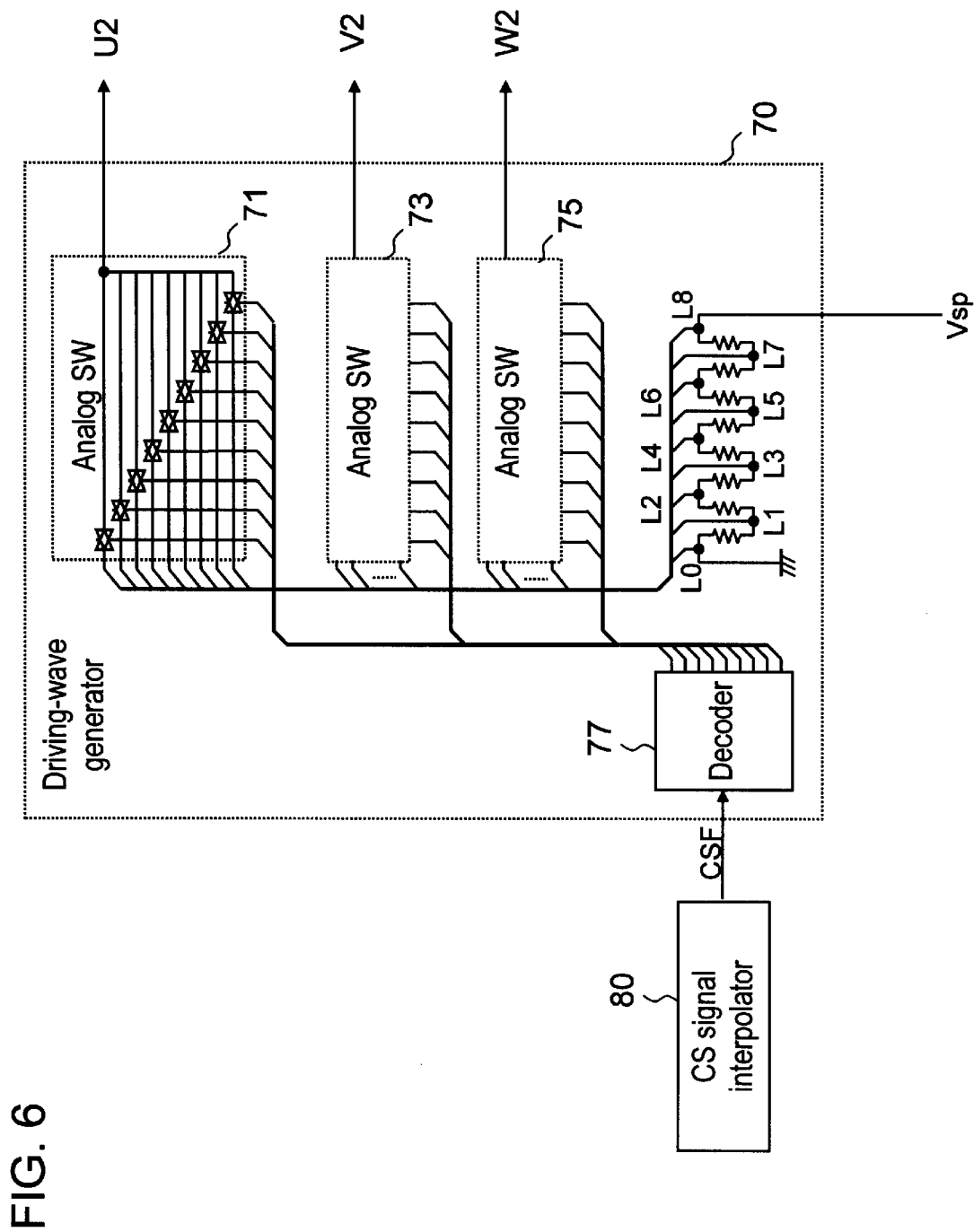
FIG. 6 illustrates analog switches of the driving waveform generator shown in FIG. 5 in detail.

Driving-waveform generator 70 is demonstrated with reference to FIG. 6. Decoder 77 receives dividing address-signal CSF from interpolator 80, and outputs a decoded signal to analog switches 71, 73 and 75. The respective analog switches are connected to a voltage-divider comprising eight resistors connected in series. Speed instructing voltage Vsp and 0 (zero) volt are applied to both terminals of the voltage divider. Voltage levels ranging from L0 to L8 are set by the voltage divider so that voltage Vsp can be divided into steps not more than 3n+1 . In this embodiment, n=3, and a number of steps should be not more than 10 (ten), and the voltage levels are thus divided into, e.g., 9 (nine) steps. This structure allows waveform generator 70 to determine ON or OFF of analog switch 71 corresponding to respective addresses of dividing address-signal CSF. Then analog switch 71 outputs step-like voltage waveform U2 for phase U. In the same manner, analog switch 73 outputs step-waveform V2 for phase V of generator 70, and analog switch 75 outputs step-waveform W2 for phase W of generator 70.

Figure 7:
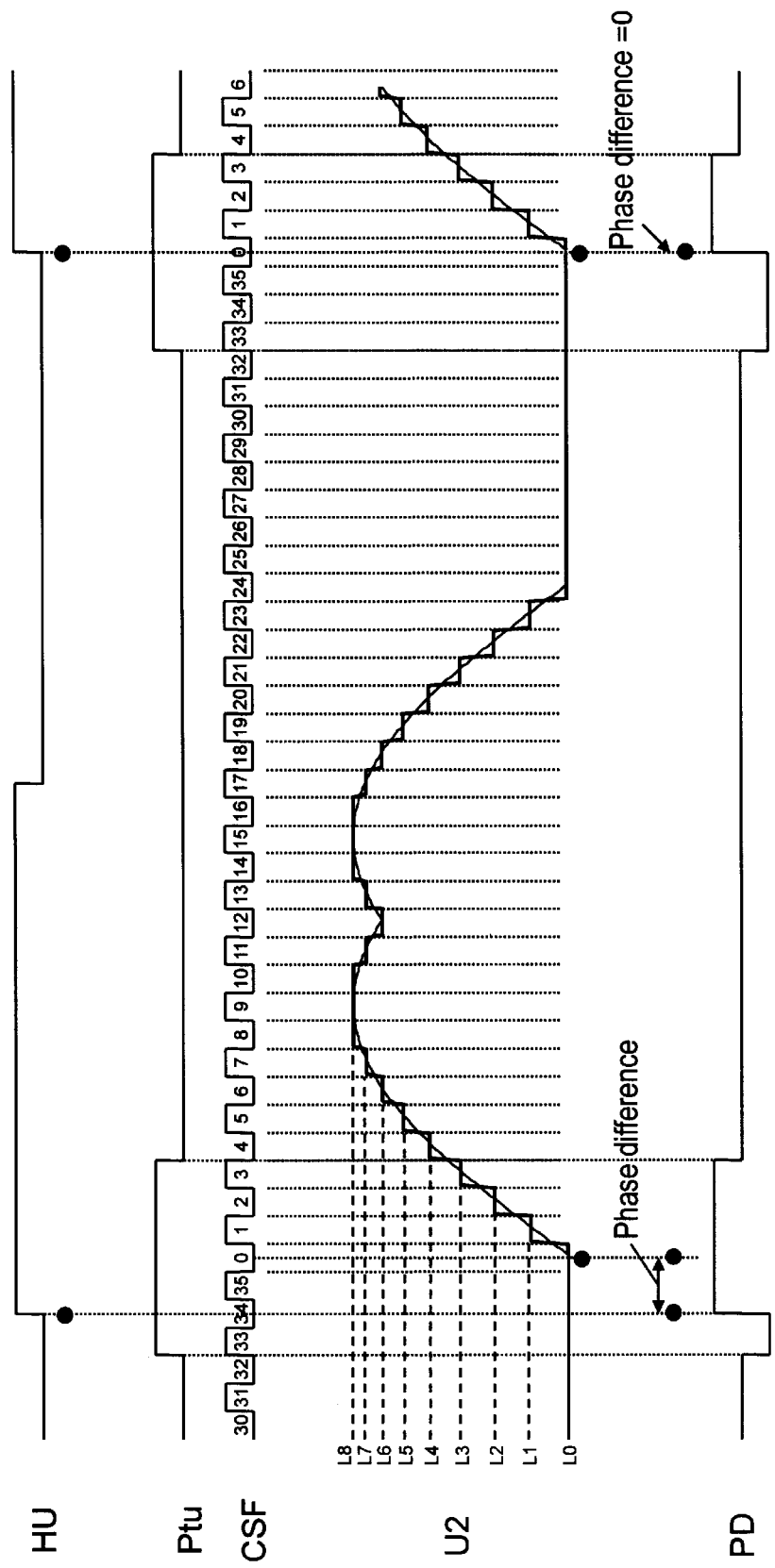
FIG. 7 illustrates an operation of generating the driving waveform in the motor driver in accordance with the first and the second embodiments.

FIG. 7 illustrates how to process a signal in interpolator 80 and waveform generator 70 shown in FIG. 5 and FIG. 6. X-axis represents a rotational angle in electrical angles, and Y-axis represents a voltage. In FIG. 7, dividing address-signal CSF indicates 36 addresses starting from 0 to 35. The pulse width covering seven addresses, i.e., three addresses both on minus side and plus side of address "0", in other words, addresses 33, 34, 35, 0, 1, 2 and 3 of signal CSF shown in FIG. 7, synchronizes with the width of voltage "H" of timing pulse "Ptu". In phase detector 81 of interpolator 80, the phase of rising edge from voltage "L" to voltage "H" of positional signal HU shown in FIG. 7 is compared with the phase of pulse Ptu. In interpolator 80, a phase locked loop (PLL) is formed, and the phase-difference is controlled by the PLL to be smaller.

On the other hand, step-like voltage waveform U2 of phase U is generated by waveform generator 70 as follows:

U2 is formed with respect to address "0" of signal CSF so that voltage level becomes "L0". U2 is formed with respect to address "1" of signal CSF so that voltage level becomes "L1".

U2 is formed with respect to address "0" of signal CSF so that voltage level becomes "L0".
U2 is formed with respect to address "1" of signal CSF so that voltage level becomes "L1".
" "2" so that voltage level becomes "L2".
" "3" so that voltage level becomes "L3".
" "4" so that voltage level becomes "L4".
" "5" so that voltage level becomes "L5".
" "6" so that voltage level becomes "L6".
" "7" so that voltage level becomes "L7".
" "8" so that voltage level becomes "L8".
" "9" so that voltage level becomes "L8".
" "10" so that voltage level becomes "L8".
" "11" so that voltage level becomes "L7".
" "12" so that voltage level becomes "L6".
" "13" so that voltage level becomes "L7".
" "14" so that voltage level becomes "L8".
" "15" so that voltage level becomes "L8".
" "16" so that voltage level becomes "L8".
" "17" so that voltage level becomes "L7".
" "18" so that voltage level becomes "L6".
" "19" so that voltage level becomes "L5".
" "20" so that voltage level becomes "L4".
" "21" so that voltage level becomes "L3".
" "22" so that voltage level becomes "L2".
" "23" so that voltage level becomes "L1".
" "24" so that voltage level becomes "L0".
" "25" so that voltage level becomes "L0".
" "26" so that voltage level becomes "L0".
" "27" so that voltage level becomes "L0".
" "28" so that voltage level becomes "L0".
" "29" so that voltage level becomes "L0".
" "30" so that voltage level becomes "L0".
" "31" so that voltage level becomes "L0".
" "32" so that voltage level becomes "L0".
" "33" so that voltage level becomes "L0".
" "34" so that voltage level becomes "L0".
" "35" so that voltage level becomes "L0".

The entire voltage-amplitude of voltage waveform U2 as generated above is variable by speed-instructing signal Vsp supplied to generator 70 from the outside. Therefore, speed control function can be added to the motor driver upon request.

Interpolator 80 thus controls the phase-difference between signal HU and pulse Ptu to be smaller. In other words, positional signal HU and dividing address-signal CSF are controlled to synchronize with each other. This synchronization entails that the cycle of waveform U2 is controlled such that the phase of address "0" of voltage-waveform U2 agrees with the phase of the rising edge changing from voltage "L" to voltage "H" of signal HU. This control accompanies the similar agreement in phase V and phase W. To be more specific, the phase of address "0" of step-waveform V2 agrees with the phase of the rising edge of signal HV, and the phase of address "0" of step waveform W2 agrees with the phase of the rising edge of signal HW.

Waveforms U2, V2, W2 synchronized with signals HU, HV, Hw respectively are generated as shown in FIG. 2B, and driving signals for respective phases are applied to power feeder 20. These driving signals have undergone PWM corresponding to the respective waveforms. The sine wave voltage "U-N" shown in FIG. 2B is thus applied between the first terminal and neutral point "N" of the phase U coil (same as V-N, W-N.) As a result, sine wave current can run through the coils of the respective phases.

Figure 8:
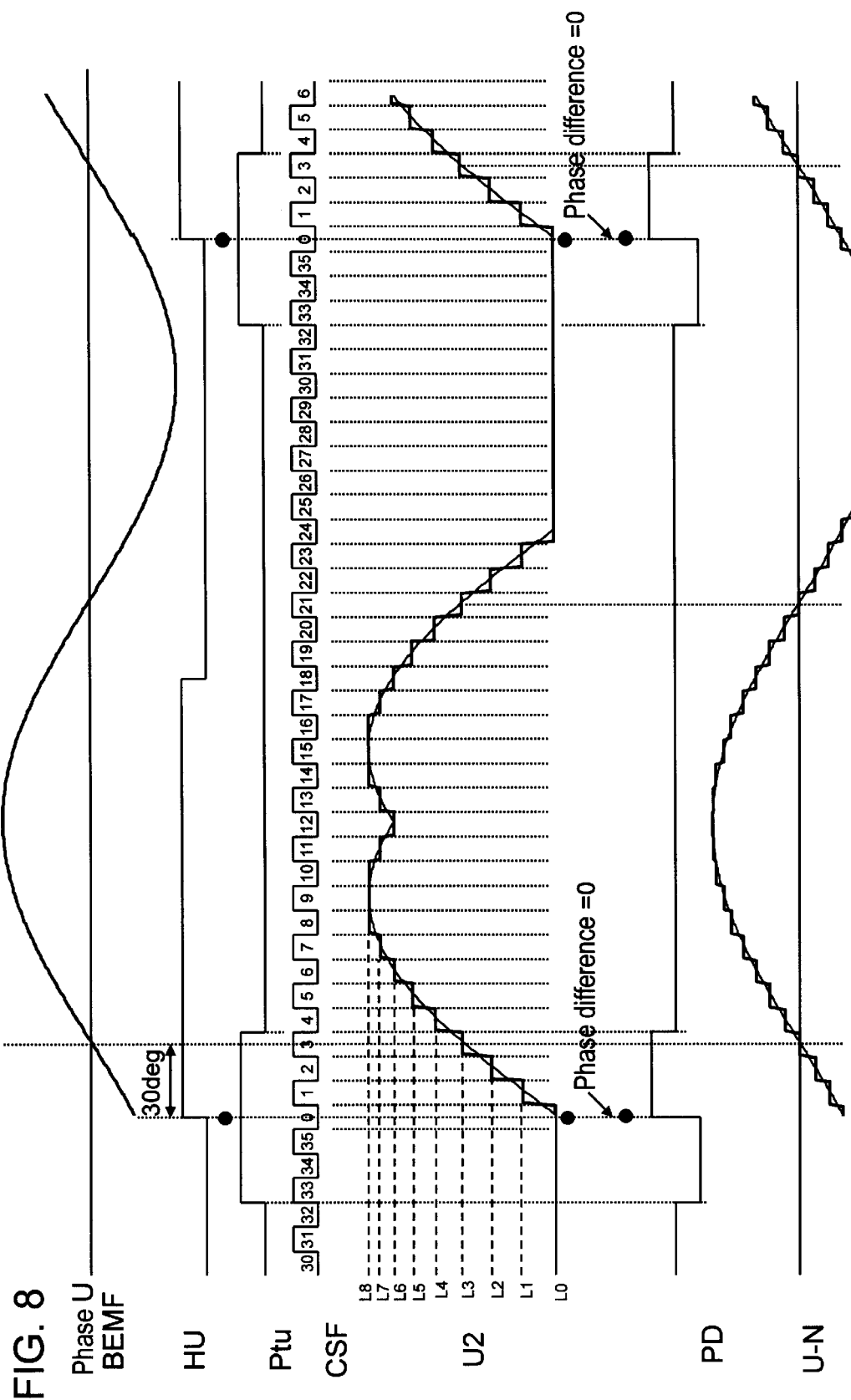
FIG. 8 illustrates an operation of generating the driving waveform in the motor driver in accordance with the first and the second embodiments.

FIG. 8 illustrates a relation between back electromotive force (BEMF) generated in the phase U coil and voltage waveform U-N applied to the phase U coil, under the condition where positional signal HU and dividing address-signal CSF are controlled to synchronize with each other.

The BEMF of the phase U coil delays from signal HU uniquely by 30 degree electrical angle. Positioning of position detector 101 with respect to the position of the phase U coil has been determined design-wise in the stator, and detector 101 and the coil are placed such that the phase difference between them is generally 30 degree electrical angle. Position detector 103 for phase V coil, and detector 105 for phase W coil are placed in the similar manner. The phase difference between the BEMF of respective coils and the positional signals can be determined in the similar manner. In this case, the step-waveforms applied between respective first terminals of each phase and neutral point N have the same phases as those of the waveforms of BEMF of each phase.

Figure 9:
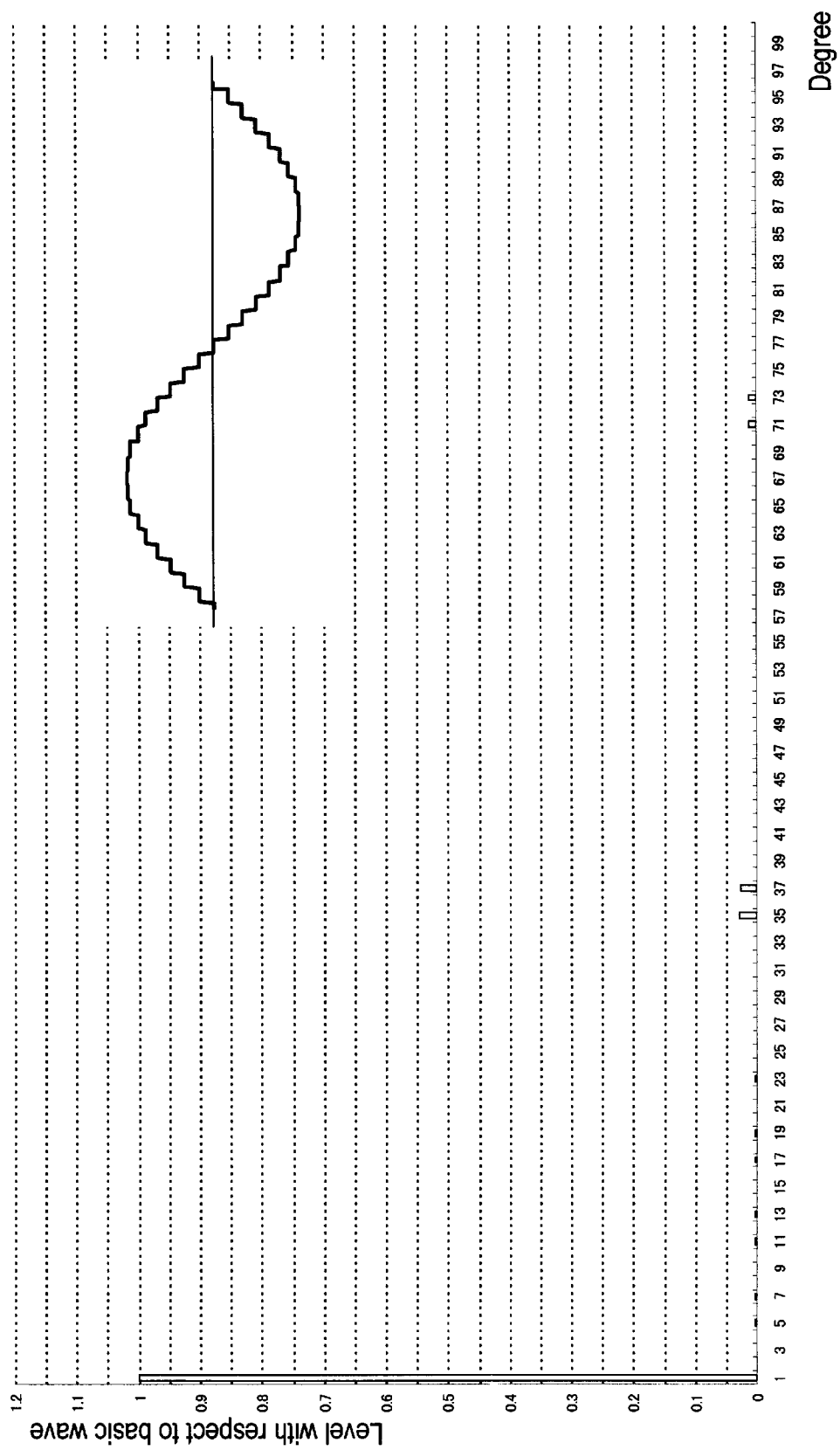
FIG. 9 illustrates a relation between degrees of a basic waveform and voltage levels with respect to the basic waveform, in a waveform of the voltage applied between the coil-ends of respective phases and a neutral point of the coils in the motor driver. Nine steps are prepared in the step waveform (3n when n=3).
Figure 10:
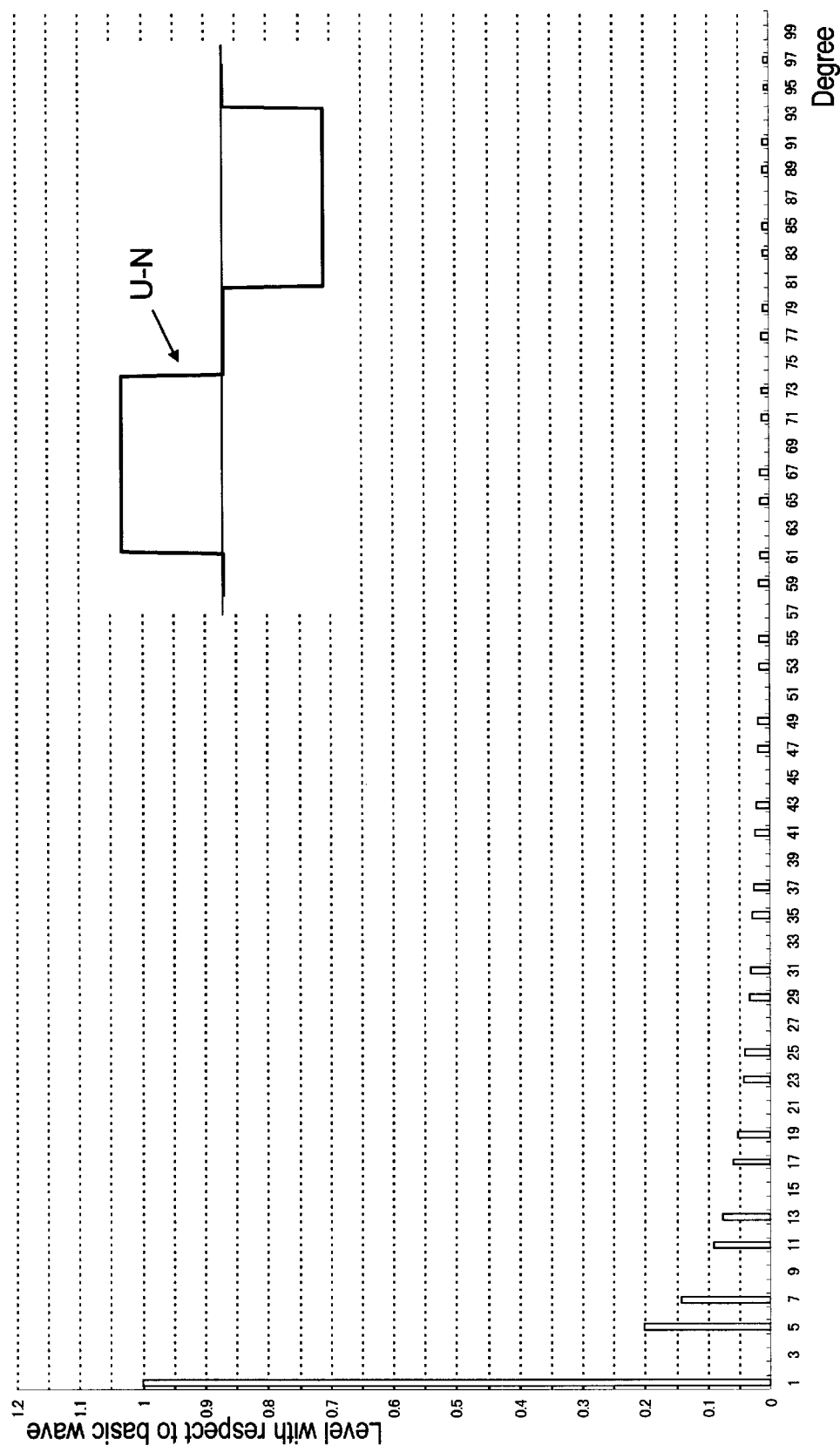
FIG. 10 illustrates a relation between degrees of a basic waveform and voltage levels with respect to the basic waveform, when a voltage applied to respective phases forms a rectangular waveform.
Figure 11:
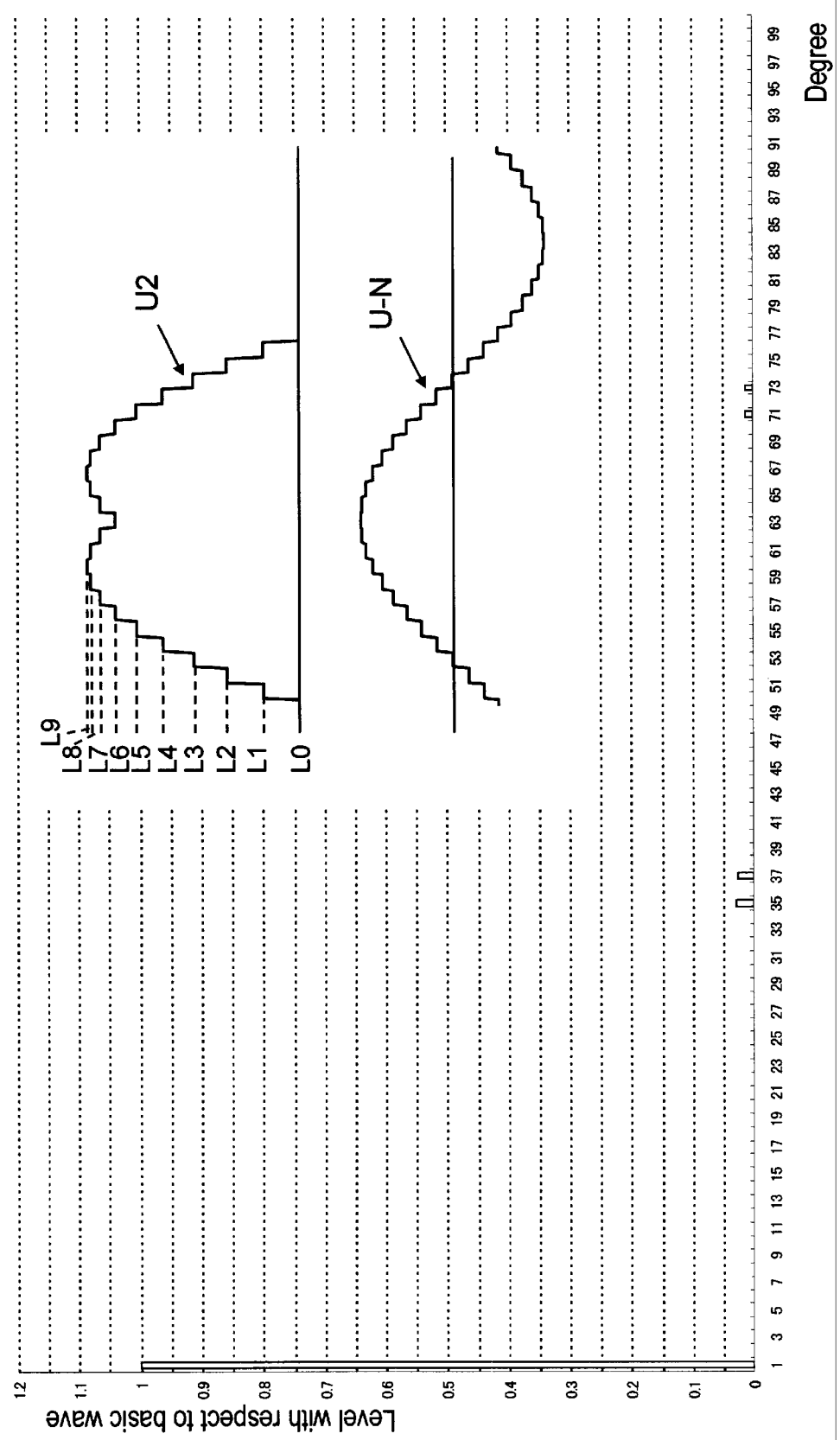
FIG. 11 illustrates a relation between degrees of a basic waveform and voltage levels with respect to the basic waveform, in a waveform of the voltage applied between the coil-ends of respective phases and a neutral point of the coils in the motor driver. Ten steps are prepared in the step waveform (3n+1 when n=3).
Figure 12:
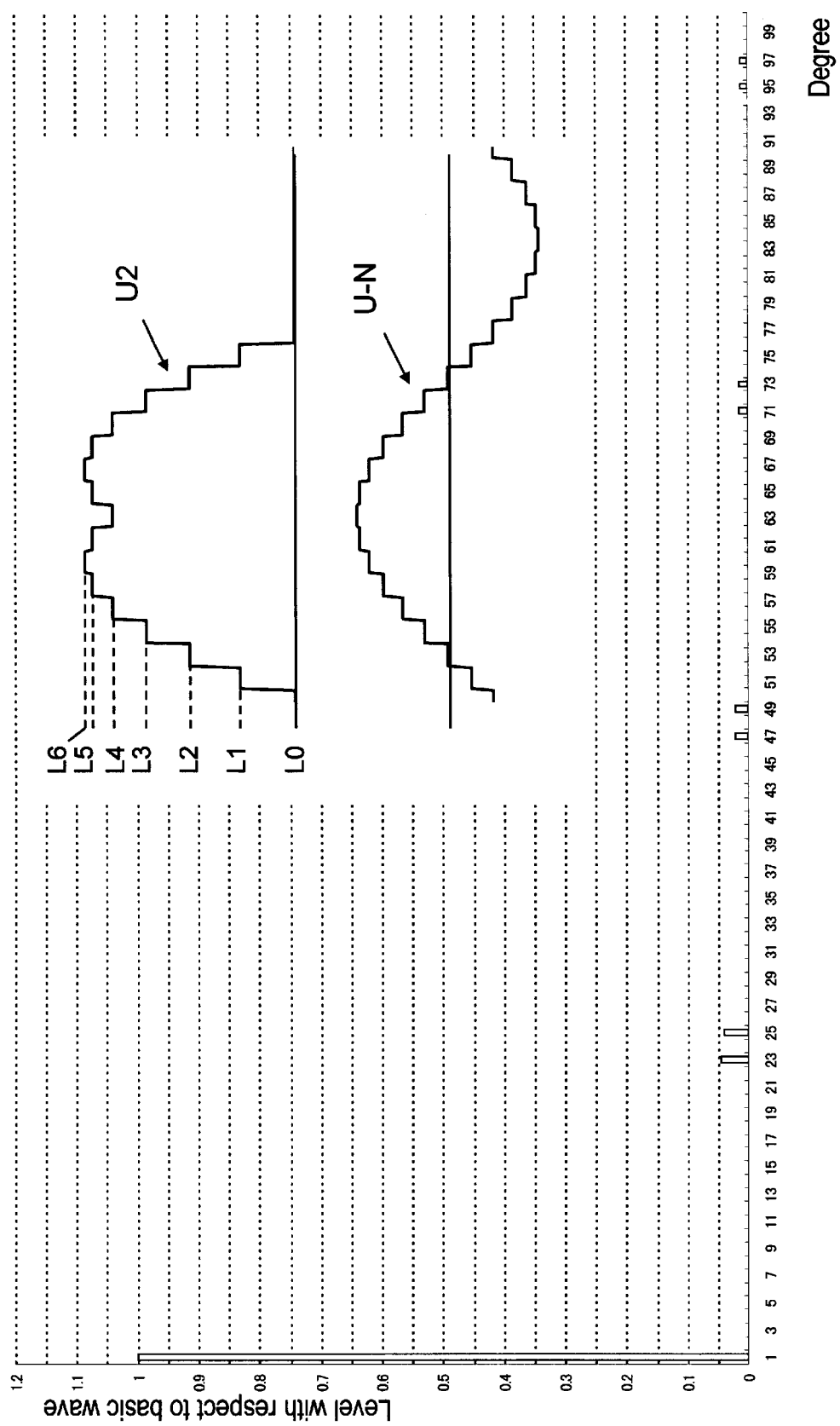
FIG. 12 illustrates a relation between degrees of a basic waveform and voltage levels with respect to the basic waveform, in a waveform of the voltage applied between the coil-ends of respective phases and a neutral point of the coils in the motor driver. Seven steps are prepared in the step waveform (3n+1 when n=2).
Figure 13:
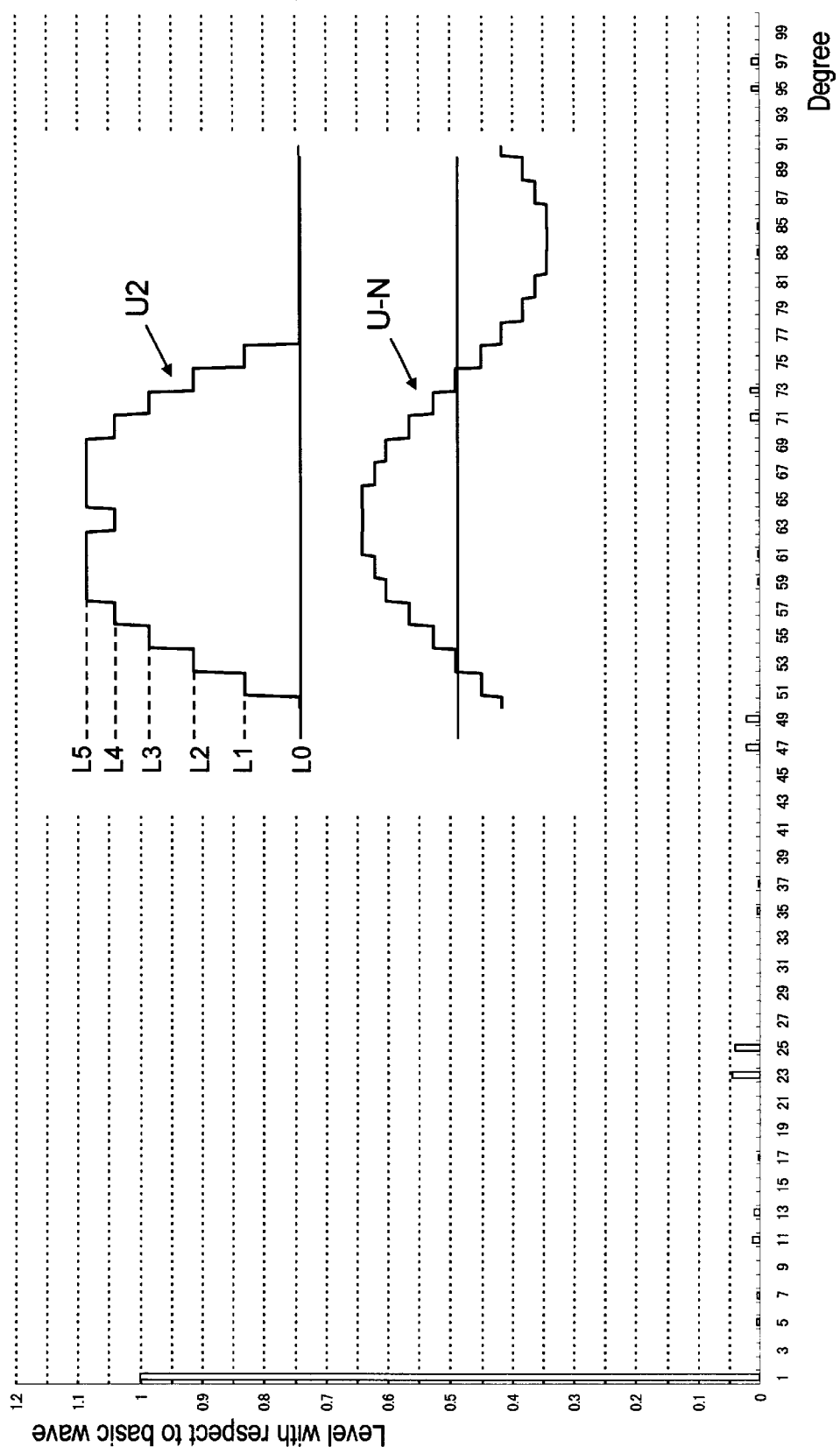
FIG. 13 illustrates a relation between degrees of a basic waveform and voltage levels with respect to the basic waveform, in a waveform of the voltage applied between the coil-ends of respective phases and a neutral point of the coils in the motor driver. Six steps are prepared in the step waveform (3n when n=2).

In the voltage waveform applied between the first terminal of coils and the neutral point of respective phases, the relation between the degree of the basic waveform and the voltage level with respect to the basic waveform is demonstrated based on several examples. FIG. 9 shows nine-step waveform (3n when n=3). FIG. 10 shows one-step waveform for comparison purpose, i.e., a rectangular waveform is applied to the coil. FIG. 11 shows ten-step waveform (3n+1 when n=3). FIG. 12 shows seven-step waveform (3n+1 when n=2). FIG. 13 shows six-step waveform (3n when n=2). In the examples shown in FIG. 9 and FIG. 11 through FIG. 13, voltage levels of frequency component at higher degrees are substantially restrained comparing with the rectangular-waveform shown in FIG. 10. As a result, harsh noises caused by the voltage levels of frequency component at higher degrees can be advantageously lowered.

If a low pass filter such as a capacitor is connected to respective outputs of the analog switches of the driving waveform generator, a distortion factor of the driving waveform can be further lowered. Thus torque ripples, vibrations and noises can be further lowered.

Structures, operations and advantages of positional signal interpolator 80 and driving waveform generator 70 have been demonstrated hereinbefore.

A function of arbitrarily shifting a phase of the voltage waveform applied to the coil of respective phases is demonstrated hereinafter. This function is realized by adjusting interpolator 80 shown in FIGS. 1 and 5 with a phase-difference control signal supplied from the outside. In FIG. 5, output CPH from phase-advancing controller 60 is supplied to an inverting input-terminal of difference-amplifier 86 of interpolator 80 via resistor 92, i.e., output PD from phase detector 81 is added to output CPH from phase-advancing controller 60.

In this structure, the phase difference between signal HU and dividing address-signal CSF with respect to phase U is controlled based on phase-difference control signal CPH supplied to interpolator 80, whereby the phase difference between signal HU and step-waveform U2 can be adjusted.

Figure 14:
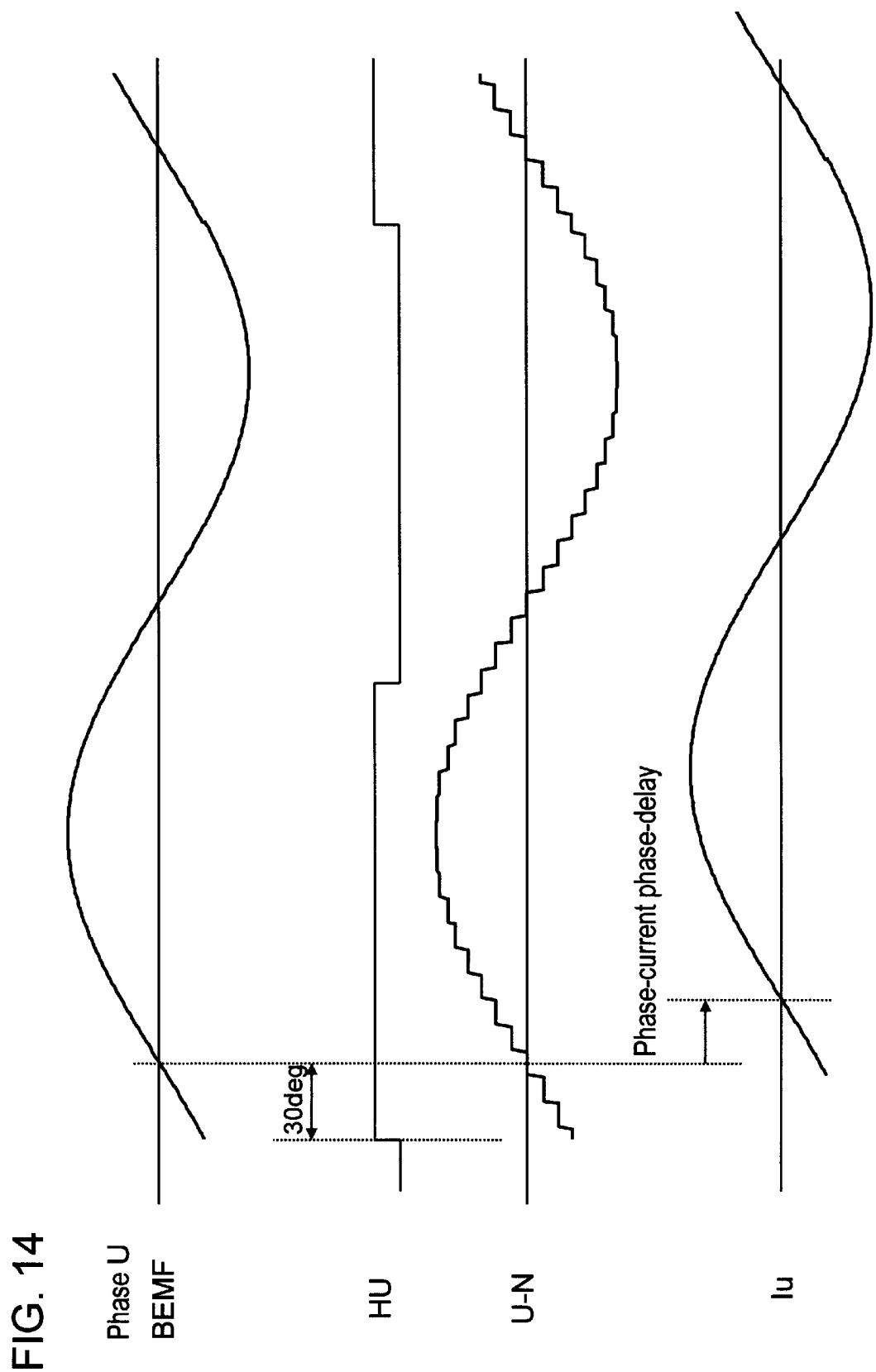
FIG. 14 illustrates how to adjust phases of phase-current in the motor driver.
Figure 15:
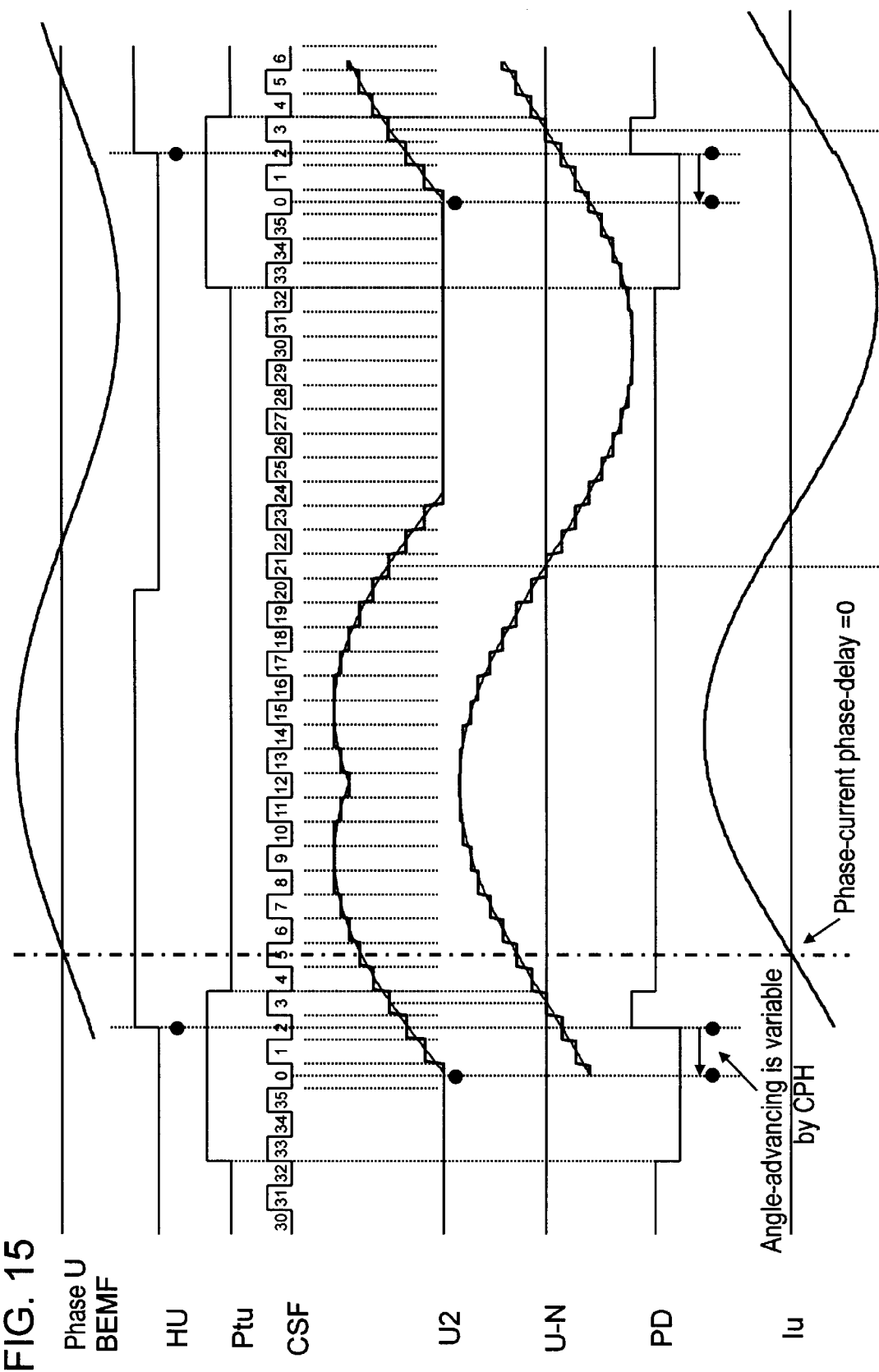
FIG. 15 illustrates how to adjust phases of phase-current in the motor driver.

FIGS. 14 and 15 illustrate how to adjust a phase of phase-current in the motor driver in accordance with the first embodiment. FIG. 14 illustrates phase-relations, with no phase-adjustment, among the BEMF generated at the phase U coil, positional signal HU, voltage waveform U-N applied between a Phase U terminal-end and neutral point N, and current Iu running through phase U. Current Iu, in general, delays in phase from waveform U-N due to inductance components of respective coils.

FIG. 15 illustrates phase-relations among the waveforms at the respective sections undergone phase-adjustment. Phase-difference control signal CPH supplied from phase-advancing controller 60 shown in FIG. 5 is fed into interpolator 80, whereby the phase-difference between signal HU and signal CSF can be controlled with signal CPH, although those two signals (HU and CSF) are synchronized with each other in phase. The phase-difference between the BEMF of phase U and step-waveform U2 can be thus arbitrarily adjusted. In FIG. 15, signal CPH is adjusted, thereby advancing a phase of signal CSF with respect to a phase of a rising edge of signal HU, i.e., advancing a phase of step-waveform U2 and a phase of voltage U-N applied between the coil-end of phase U and neutral point N. As a result, phase U current advances so that the BEMF of phase U can agree with phase U current "Iu" in phase. Then motor efficiency increases. In the phase U coil, if the phase of the BEMF agrees with that of the phase current, the same phenomena can be seen, as a matter of course, in phases V and W.

Figure 16:
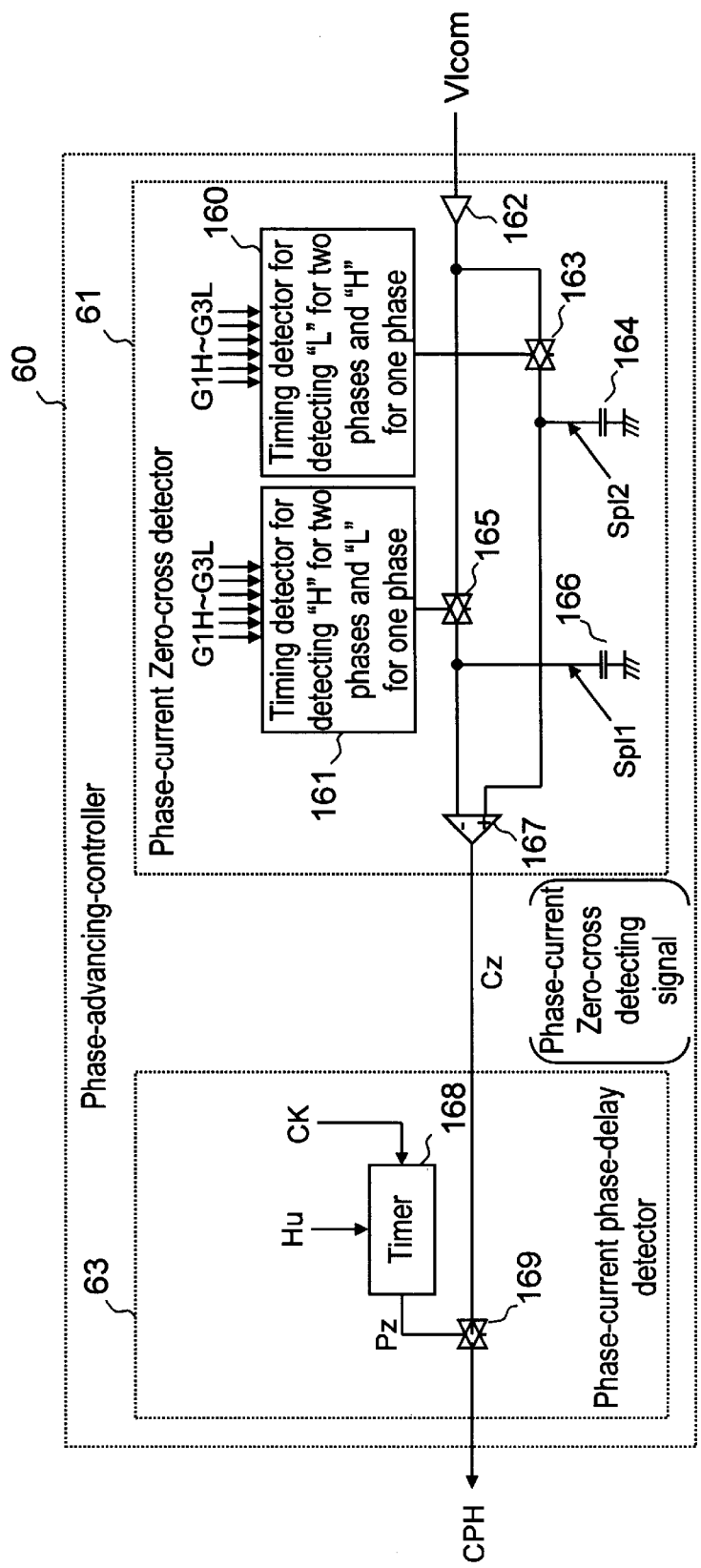
FIG. 16 is a circuit diagram of a phase-advancing controller in the motor driver.

FIG. 16 shows a circuit diagram of an phase-advancing controller for phase U. Phase-advancing controller 60 includes phase-current zero-cross detector 61 and phase-current phase-delay detector 63.

Zero-cross detector 61 is structured as follows: Common current detecting voltage "VIcom"—undergone voltage-conversion by resistor 27 inserted in a feeding line between power supply 10 and power feeder 20 shown in FIG. 1—is supplied to a first input terminal of comparator 167 via buffer 162 and analog switch 165. At the same time, "VIcom" is supplied to a second input terminal of comparator 167 via buffer 162 and analog switch 163. Sampling and holding capacitor 166 is coupled between the grounding and an output on comparator 167 side of analog switch 165. Sampling and holding capacitor 164 is coupled between the grounding and an output on comparator 167 side of analog switch 163. Signals G1H through G3L fed into gate driver 30 shown in FIG. 1 are supplied to a control terminal of analog switch 165 via timing detector 161.

In the same manner, signals G1H through G3L are supplied to a control terminal of analog switch 163 via timing detector 160. Comparator 167 outputs phase-current zero-cross signal Cz. This output is supplied to analog switch 169 of phase-current phase-delay detector 63.

A structure of phase-current phase-delay detector 63 is demonstrated. Signal Cz discussed above is tapped off from phase-advancing controller 60 as phase-difference control signal CPH via analog switch 169, then signal CPH is supplied to interpolator 80. ON-OFF of switch 169 is instructed by output Pz from timer 168 which is controlled by signal Hu and output CK supplied from voltage-control oscillator 85 disposed in interpolator 80.

An operation of phase-advancing controller 60 for phase U, of which structure is discussed above, is demonstrated hereinafter. First, an operation of phase-current zero-cross detector 61 is demonstrated. In the condition where signals G1H through G3L turn the voltages (Vu, Vv, Vw) at three-phase output terminals of power feeder 20 to "H" for two phases and "L" for one phase, analog switch 165 is turned ON and holds the instant voltage VIcom at capacitor 166. On the other hand, in the condition where signals G1H through G3L turn the voltages (Vu, Vv, Vw) at three-phase output terminals of power feeder 20 to "L" for two phases and "H" for one phase, analog switch 163 is turned ON and holds the instant voltage VIcom at capacitor 164. The voltage held at capacitor 166 is denoted "sp11" and that at capacitor 164 is denoted "sp12". At the time when the two voltages held agree with each other, i.e., when the output from comparator 167 changes, e.g., from "" to "L", the phase-current finds itself at zero-cross. This is detailed with reference to FIG. 18.

Signals G1H through G3L either in level "H" or "L"—the control signals of switches 163 and 165—are supplied via gate driver 30 to respective gates of transistors 21 through 26 forming power feeder 20. These transistors are thus turned ON or OFF by those respective gate signals. In other words, the voltages (Vu, Vv, Vw) at the three-phase output terminals of power feeder 20 are controlled ON or OFF based on the level of "H" or "L" of signals G1H through G3L.

Figure 18:
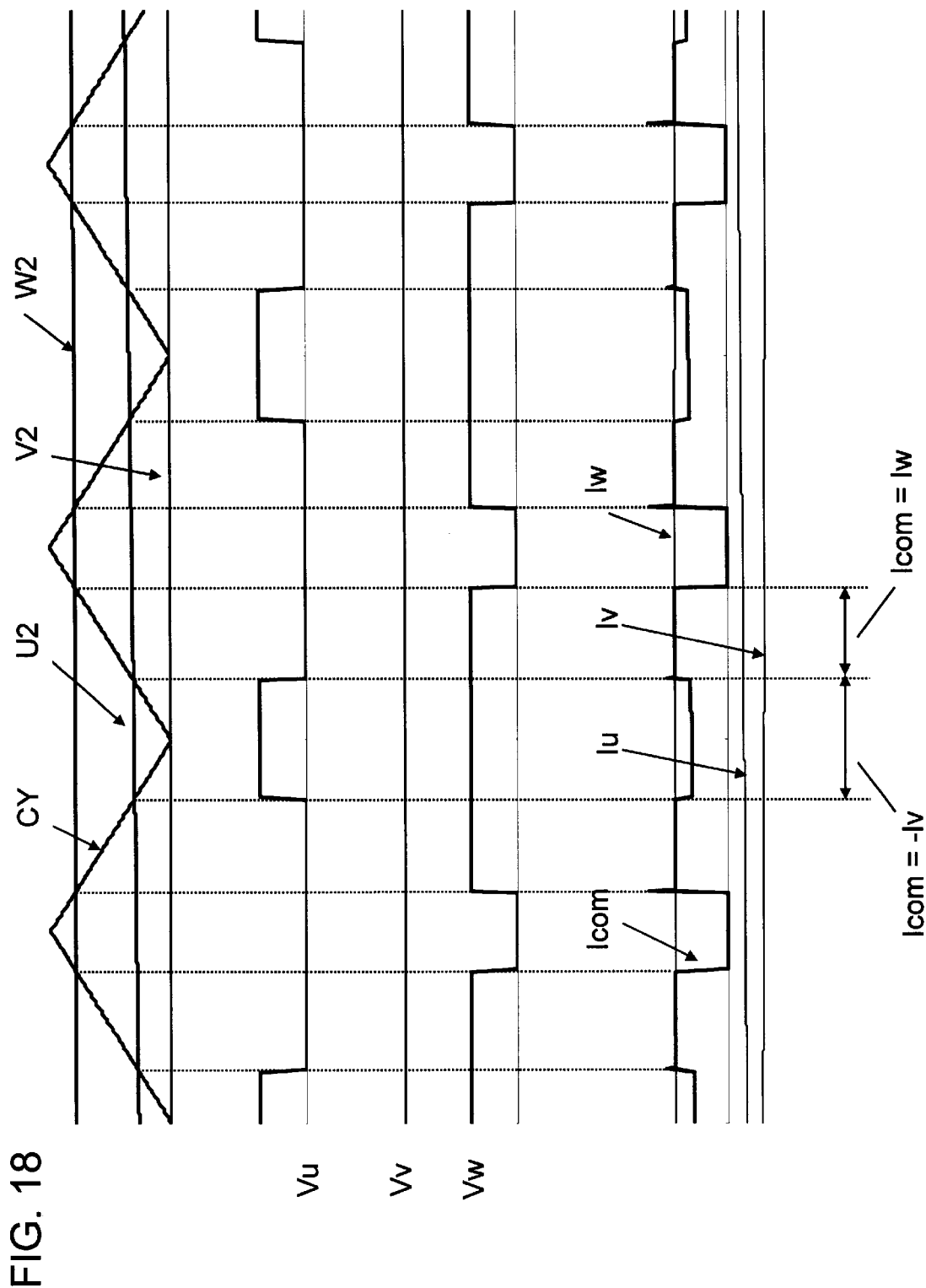
FIG. 18 illustrates a detection of a zero-cross timing of an alternate current in the respective phases of the motor driver.

Assume that Vu stands at "H", Vv at "L" and Vw at "H"—in the power feeder and the three-phase coils shown in FIG. 1, then transistor (Tr) 21 is ON, Tr 22 is OFF, Tr 23 is OFF, Tr 24 is ON, Tr 25 is ON and Tr 26 is OFF. At this time, one of the currents starts from the positive terminal of power supply 10 and runs through Tr 21, phase U coil, the neutral point, phase V coil, Tr 24 and resistor 27 before returning to the negative terminal of power supply 10. Another current starts from the positive terminal of power supply 10 and runs through Tr 25, phase W coil, the neutral point, phase V coil, Tr 24 and resistor 27 before returning to the negative terminal of power supply 10. Assume that the current direction running to neutral point N from the three-phase terminal of power feeder 20 is positive, and the reversal direction is negative. In this condition, current "–Iv" running through the phase V coil appears as a voltage drop at resistor 27 due to common current Icom, i.e., the terminal voltage of resistor 27. In FIG. 18, when voltages Vu stands at level "H", Vv at "L" and Vw at "H", Icom becomes, therefore, equal to "–Iv".

Next, assume that voltages Vu stands at "L", Vv at "L" and Vw at "H", then Tr 21 is OFF, Tr 22 is ON, Tr 23 is OFF, Tr 24 is ON, Tr 25 is ON and Tr 26 is OFF. At this time, one of the currents starts from the positive terminal of power supply 10 and runs through Tr 25, phase W coil, the neutral point, phase U coil, Tr 22 and resistor 27 before returning to the negative terminal of power supply 10. Another current starts from the positive terminal of power supply 10 and runs through Tr 25, phase W coil, the neutral point, phase V coil, Tr 24 and resistor 27 before returning to the negative terminal of power supply 10. In this condition, current "Iw" running through the phase W coil appears as a voltage drop at resistor 27 due to common current Icom, i.e., the terminal voltage of resistor 27. In FIG. 18, when voltages Vu stands at level "L", Vv at "L" and Vw at "H", Icom becomes, therefore, equal to Iw.

This tells that, when two phases out of the voltages (Vu, Vv, Vw) at the three-phase output terminals of power feeder 20 stand at "H" and one phase stands at "L", the current of which polarity is reversed from that of the coil current of the phase only standing at "L" runs as common current Icom. For instance, when only Vv stands at "L", Icom=–Iv.

When two phases stand at "L" and one phase stands at "H", the coil current of the phase only standing at "H" runs as Icom. For instance, only Vw stands at "H", Icom=Iw.

In the above description, the directions of currents Iu, Iv, Iw and Icom are marked with arrows shown in FIG. 1 as a positive direction.

Therefore, in phase-current zero-cross detector 61 shown in FIG. 16, and in the condition where control signals G1H through G3L turn two of voltages Vu, Vv and Vw to "H" and remaining one to "L", analog switch 165 is turned ON and retains the instant voltage VIcom at capacitor 166. The value of current, of which polarity is reversed from the current of the phase only standing at "L", is detected, and the value is retained as retained voltage "sp11" at capacitor 166. For instance, when phase V only stands at "L", a reversly directed current –Iv of phase V is detected and retained as retained voltage "sp11". On the other hand, in the condition where control signals G1H through GL3 turn two phases out of three voltages Vu, Vv and Vw to "L" and remaining one to "H", analog switch 163 is turned ON and retains the instant voltage VIcom at capacitor 164. The current value of the phase only standing at "H", is detected, and the value is retained as retained voltage "sp12" at capacitor 164. For instance, when phase W only stands at "H", current Iw of phase W is detected and retained as retained voltage "sp12".

Signals G1H through G3L discussed above are output signals from pulse-width-modulation (PWM) comparator 40, as described in FIG. 1, and repeat the levels of "L" and "H" at a high frequency ranging from 17 kHz to 20 kHz. Voltages (Vu, Vv, Vw) at the three-phase output terminal of feeder 20 are linked with this movement, and repeat the levels of "L" and "H".

In these operations, ON status of switch 165 and ON status of switch 163 never occur simultaneously as shown in FIG. 18, but occur closely. In the ON status of switch 165, two phases out of three phases (Vu, Vv, Vw) stand at "H" and remaining one phase stands at "L". In the ON status of switch 163, two phases out of three phases (Vu, Vv, Vw) stand at "L" and remaining one stands at "H".

In the retained voltages "sp11" and "sp12", current values (e.g. –Iv and Iw) of different but closely timed phases are detected and retained. As such, if the coil currents (e.g. –Iv and Iw) of two phases can be detected, the coil current of the remaining one phase (e.g. Iu) can be found with ease because the sum of the three-phase coil-currents is zero (0).

The timing, when voltage "sp11" retained by capacitor 166 agrees with voltage "sp12" retained by capacitor 164, corresponds to the timing when the coil currents (e.g. –Iv and Iw) of two phases agree with each other and the remaining phase current (e.g. Iu) becomes zero (0).

In other words, comparator 167 compares retained voltage "sp11" with "sp12", and the resulting output can detect the zero-cross timing of phase U current as a timing, e.g., when "H" changes to "L". The zero-cross timings of phase V and phase W currents can be detected in the same manner.

Figure 19:
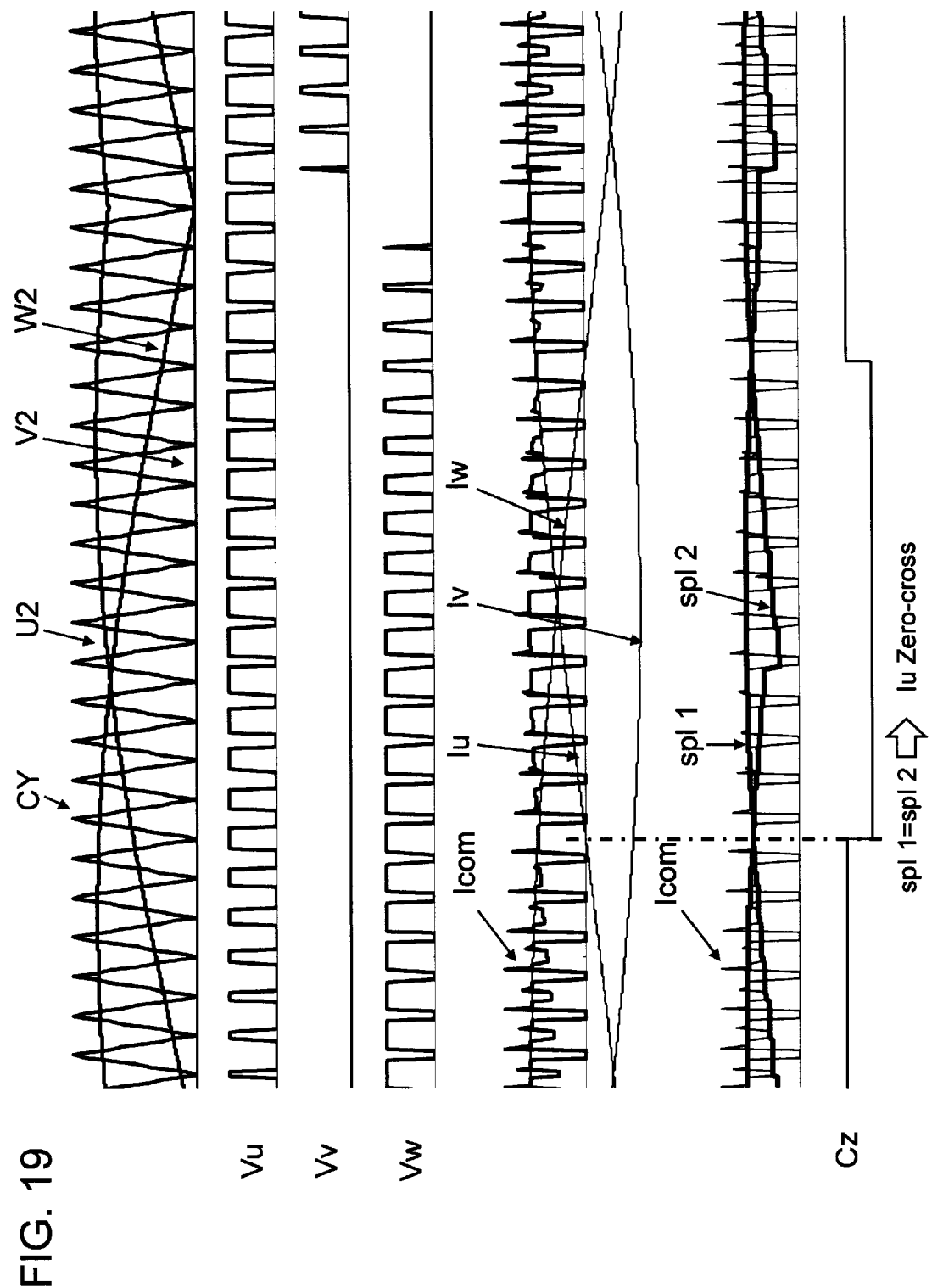
FIG. 19 illustrates a detection of a zero-cross timing of an alternate current in the respective phases of the motor driver.

The timing axis of FIG. 18 is shown in FIG. 19 in a reduced scale. FIG. 19 illustrates how to detect a zero-cross timing of a phase-current. The timing when retained voltage "sp11" agrees with "sp12" is the timing of the zero-cross of phase U current Iu, and the timing is obtained as an output of zero-cross detector 61, namely, the timing when signal Cz changes from "H" to "L".

Figure 17:
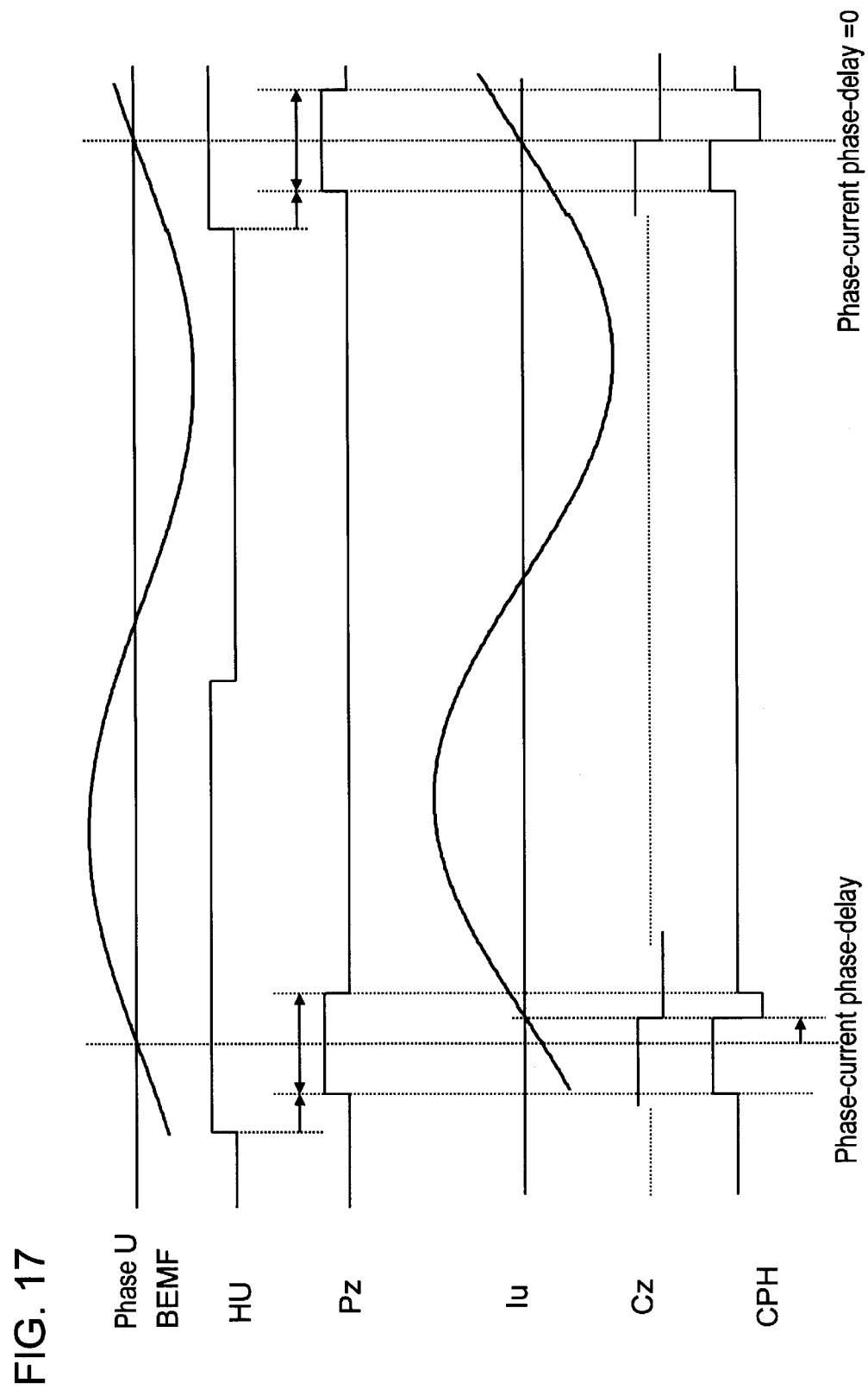
FIG. 17 illustrates how to control the phase-advancing in the motor driver.

Next, an operation of phase U current phase-delay detector 63 shown in FIG. 16 is demonstrated. Timer 168 receives signal Hu and output-signal CK from voltage-control oscillator 85 disposed interpolator 80, and outputs control-signal Pz having a given pulse-width to analog switch 169. As shown in FIG. 17, timer 168 produces control signal Pz as a signal standing at "H" during a given pulse width of which center is placed at the zero-cross timing of phase U back-electromotive voltage. Timer 168 uses the rising edge of signal Hu as a starter of clocking time, and clocks the time using signal CK as a clock signal. Analog switch 169 is turned ON only when signal Pz stands at "H", and this allows signal Cz as signal CPH to run through switch 169. The width of signal CPH is equal to the width while signal Pz stands at "H". In other words, when the duty ratio of "H" vs. "L" becomes 50%, i.e., when the period of "H" agrees with the period of "L", the phase delay of phase-current from the phase of back-electromotive voltage becomes zero (0).

In this first embodiment, as shown in FIG. 1, the output from phase-advancing controller 60, i.e., phase-difference control signal CPH, is fed into interpolator 80. This allows a voltage-output phase of three-phase step-waveform supplied from driving waveform generator 70 to be advanced, and allows phase-advancing control—for agreeing a phase for BEMF generated at respective coils with a phase of an alternative current (sine-wave current) changing the coils sequentially—to be operated automatically. This mechanism can drive a motor always in a highly efficient manner even if load to the motor changes.

The first embodiment shown in FIG. 1 describes a case where the motor driver has one interpolator 80 for receiving positional signal Hu corresponding to phase U. The motor driver can have individual interpolators for signal Hv and Hw. In such a case, driving waveform generators follow the respective interpolators. Each of the generators receives a dividing address-signal corresponding to the respective phases, and outputs a voltage of step-waveform having a voltage level predetermined corresponding to each address of the dividing address-signal.

Further in this embodiment, zero-cross is only detected in phase U; however, it can be detected in two or three phases, and the detection results of the phases are synthesized for phase advancing control.

Signals can be processed by a microcomputer or software in interpolating, generating a driving waveform, controlling angle advancing and the like.

Second Exemplary Embodiment

Figure 4:
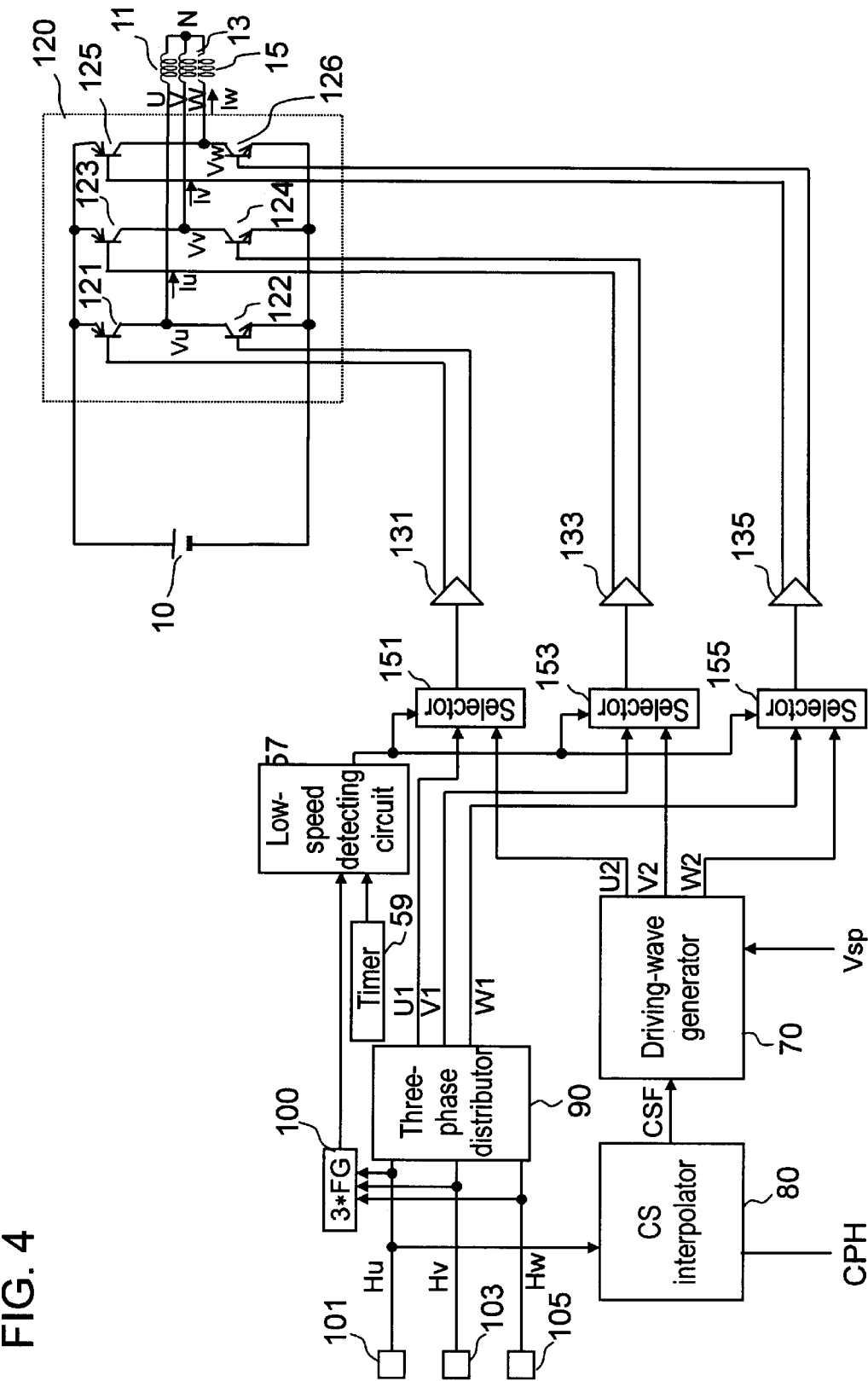
FIG. 4 is a circuit diagram of a motor driver in accordance with a second exemplary embodiment of the present invention.

FIG. 4 is a circuit diagram of a motor driver in accordance with the second embodiment of the present invention. The second embodiment differs from the first one in the following points: In the first embodiment, signals supplied from respective selectors run through PWM comparator 40, gate driver 30, and are applied to gates of six transistors forming power feeder 20, whereby currents run through the coils. The signals have undergone the pulse width modulation and are applied as three-phase driving signals to the gates.

On the other hand, in the second embodiment as shown in FIG. 4, an output signal from selector 151 is applied to respective bases of bipolar transistors 121 and 122 as a driving signal via amplifier 131. An output signal from selector 153 is applied to respective bases of bipolar transistors 123 and 124 as a driving signal via amplifier 133. In the same manner, an output signal from selector 155 is applied to respective bases of bipolar transistors 125 and 126 as a driving signal via amplifier 135. The other structures remain the same as that of the first embodiment shown in FIG. 1.

In the motor driver having the structure discussed above, a step-waveform generated by driving waveform generator 70 runs through respective selectors, and is amplified by respective amplifiers, then power-amplified by six transistors. Finally, the alternate current, which changes sequentially, runs in three-phase driving coils 11, 13, 15. Structures and operations of interpolator 80 and generator 70 are the same as those in the first embodiment, and phase-advancing control using phase-difference control signal CPH supplied from an phase-advancing controller (not shown) is also the same as that in the first embodiment. Therefore, the same advantage as the first embodiment can be expected.

Third Exemplary Embodiment

Figure 20:
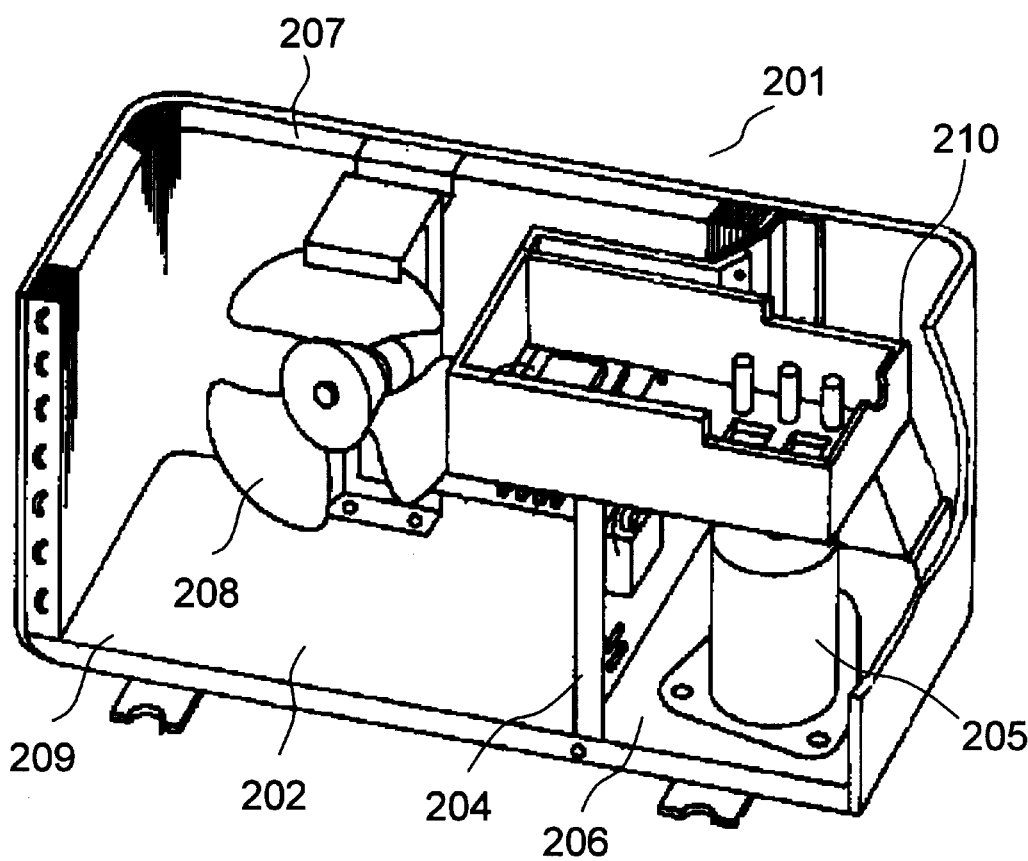
FIG. 20 illustrates an indoor unit of an air-conditioner employing the motor driver of the present invention as a fan motor.
Figure 21:
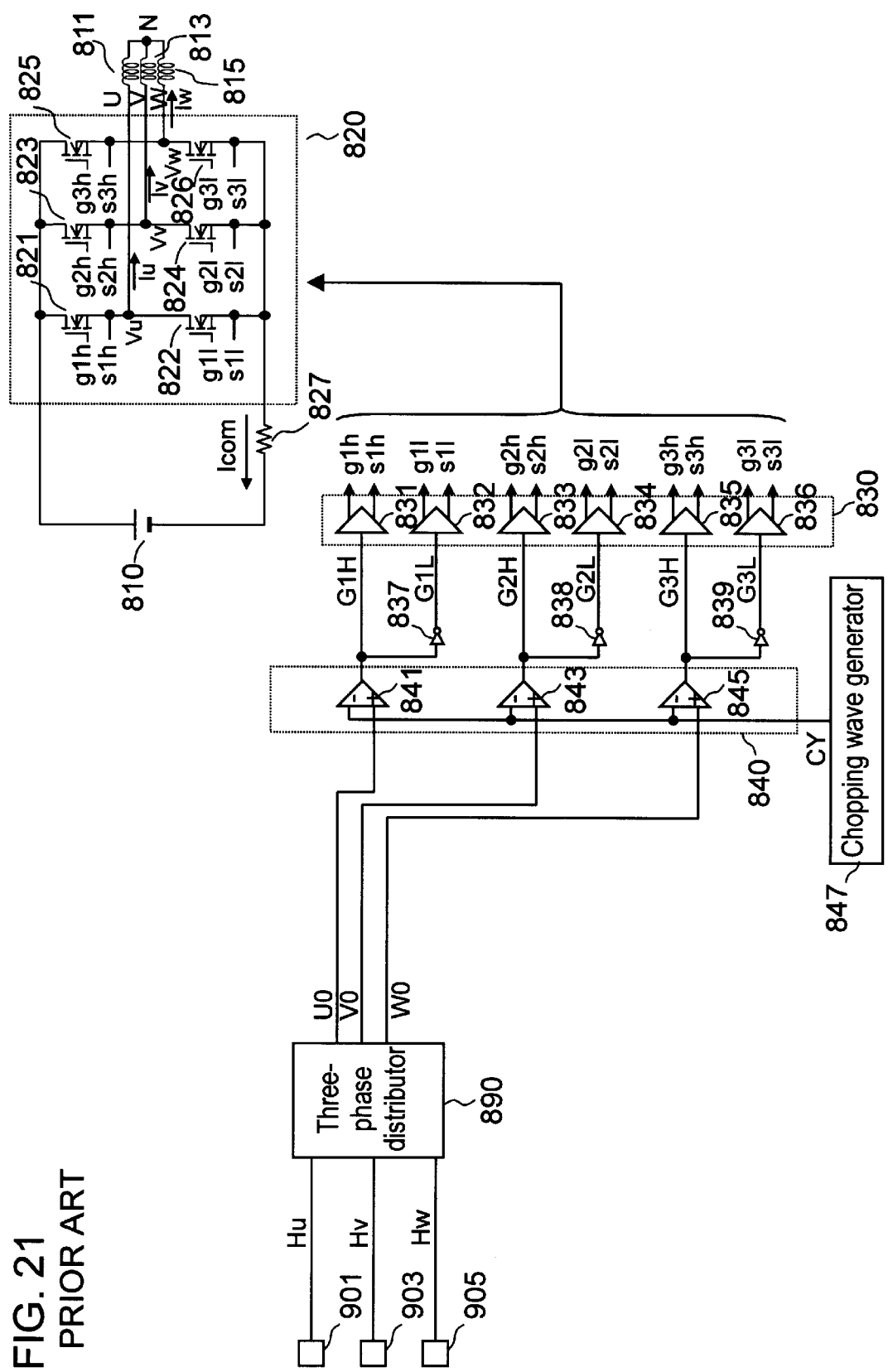
FIG. 21 shows a circuit diagram of a conventional motor driver.
Figure 22:
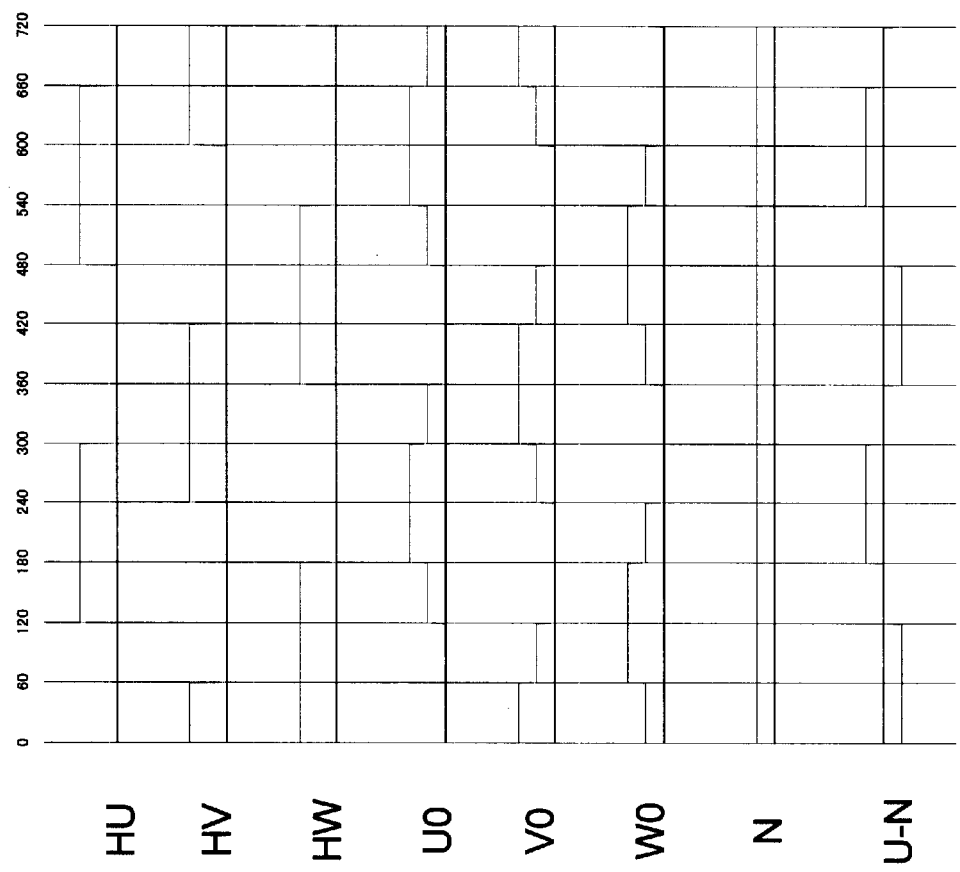
FIG. 22 shows signal-waveforms with respect to a rotational angle (electrical angle) of a motor at respective sections when rectangular-waveforms are applied to the respective phase-coils in the conventional motor driver shown in FIG. 21.

FIG. 20 illustrates an outdoor unit of an air conditioner using a fan motor employing the motor driver of the present invention. In FIG. 20, outdoor unit 201 is partitioned into compressor room 206 and heat exchanging room 209 by partition 204 vertically disposed on bottom plate 202. Compressor 205 is disposed in room 206, and heat exchanger 207 as well as blower fan-motor 208 is disposed in room 209. Box 210 containing electrical equipment is disposed on partition 204.

Fan motor 208 is structured by a blower fan mounted to the rotational shaft of a brush-less DC motor. Fan motor 208 is driven by a motor driver housed in box 210. Fan motor 208 spins to rotate blower fan, and the wind cools heat exchanging room 209.

The motor driver in accordance with the first or the second embodiment can be used in this third embodiment. Therefore, the alternate current (preferably a sine wave current), which changes sequentially, runs through the motor driving coils, so that torque ripple at driving the motor, vibrations and noises can be reduced, and further, an efficient motor-driving can be realized. As a result, the outdoor unit of an air conditioner advantageously effects lower noise, lower vibrations and higher efficiency.

As discussed above, when the motor driver of the present invention is employed in a fan motor, the apparatus using the fan motor can lower its noises and vibrations, and realize highly efficient operation. Here is several examples of apparatuses suitable for employing the fan motor having the motor driver of the present invention.

Regarding an air conditioner, the present invention can be applied not only to an outdoor unit but also to an indoor unit which blows cool or warm wind into a room. The indoor unit employing a fan motor having the motor driver of the present invention can effect extremely calm and low vibrations.

The present invention can be also applied to an air cleaner. The air cleaner employing a fan motor having the motor driver of the present invention can effect extremely calm and low vibrations. The air cleaner advantageously effects these features particularly at a bedroom in the night.

The present invention can be further applied to a water heater such as a gas water-heater and an oil burning water-heater. The water heater employing a burning fan motor having the motor driver of the present invention can effect extremely calm, low noises and high efficient.

The motor driver of the present invention needs not to have a ROM table for pre-storing waveform data when a step-like driving waveform is generated. Therefore, a driving waveform generator—simply constructed with a small number of resistors coupled in series—is used. Because the generator generates a waveform having rather small numbers of steps divided and voltage levels divided. Respective phase driving signals responsive to the driving waveform generator are applied to the power feeder, whereby the alternate current-shaping in sine wave and changing sequentially-run through the respective phase coils. Further, each of BEMF generated in respective phase-coils agrees with the respective current-phases by the phase advancing control. When the phase advancing control starts, phase-current zero cross is detected based on the common current. As a result, each of phase-currents needs not to be detected individually for respective phases, and a simple construction is achieved. This structure advantageously allows the motor driver of the present invention not only to reduce torque ripples, vibrations and noises, but also to maintain efficient driving of the motor.

When the motor driver of the present invention is employed to a fan motor, various apparatuses using the fan motor not only can reduce noises and vibrations but also realize efficient operation.

Industrial Applicability

The motor driver of the present invention has a driving waveform generator simply constructed. Because the generator generates a waveform having rather small numbers of steps divided and voltage levels divided. A step-like voltage waveform is generated by the generator, and respective phase driving signals corresponding to the step-like waveforms is applied to the power feeder, whereby an alternate current shaping in a sine wave and changing sequentially runs through the respective phase-coils. Further, each of BEMF generated in respective phase-coils agrees with the respective current-phases by the phase advancing control. This structure advantageously allows the motor driver of the present invention not only to reduce torque ripples, vibrations and noises, but also to maintain efficient driving of the motor. This motor driver is suited for driving a brush-less DC motor used in information devices such as a copier and a printer, it is also suited driving a fan motor used in, e.g., an air conditioner and a water heater.

What is claimed is:

1. A motor driver comprising:
   (a) a driving coil for each of three phases
   (b) a power feeder, coupled to a dc power supply, for powering said respective phase-coils;
   (c) a position detector for detecting a position of a mover of the motor with respect to said respective phase-coils;
   (d) a positional signal interpolator, disposed for at least one of the phases, for dividing one cycle in electrical angles of a positional signal of at least one phase into "3n×4" cycles ("n" is an integer equal to or more than one), where the positional signal is supplied from said position detector; and
   (e) a driving waveform generator for receiving a dividing address-signal from said interpolator, generating step waveforms having predetermined voltage levels (levels not more than "3n+1" steps) corresponding to respective addresses of the dividing address-signal for the three phases, and outputting the step waveforms in voltages,
   wherein respective driving signals for the three phases—corresponding to the step waveforms for the three phases—are applied to said power feeder, so that an alternative current changing sequentially drives the respective phase-coils.

2. The motor driver of claim 1, wherein, in said driving waveform generator, the voltage levels are divided into not more than "3n+1" steps by a voltage divider comprising resistors not more than "3n" pieces coupled in series.

3. The motor driver of claim 1, wherein, regarding at least one phase, a phase difference between the positional signal and the dividing address-signal is controlled based on a phase-difference control signal supplied to said interpolator, so that a phase difference between the positional signal and the step waveform is adjustable.

4. The motor driver of claim 3, wherein the adjustable phase difference between the positional signal and the step waveform allows to adjust a phase difference between an induction voltage of said coils having given phase relations with the positional signal and an alternate voltage applied to said coils responsive to the step waveforms.

5. The motor driver of claim 3 further comprising a phase advancing controller for outputting the phase-difference control signal to said interpolator, wherein the step waveform is advanced in electrical angles with the phase-difference control signal, so that the alternate current running through said coils is controlled such that a phase of the alternate current agrees with a phase of an induction voltage of at least one of said coils.

6. The motor driver of claim 3 further comprising a phase advancing controller for outputting the phase-difference control signal to said interpolator, wherein the step waveform is advanced in electrical angles with the phase-difference control signal, so that the alternate current running through said coils is controlled such that a zero cross timing of the alternate current agrees with a zero cross timing of an induction voltage of at least one of said coils.

7. The motor driver of claim 6, wherein the zero cross timing of at least one phase of the alternate current is detected by a common current running through a line between the dc power supply and said power feeder.

8. A motor driver comprising:
   (a) a driving coil for each of three phases
   (b) a power feeder, coupled to a dc power supply, for powering said respective phase-coils;
   (c) a position detector for detecting a position of a mover of the motor with respect to said respective phase-coils;
   (d) a positional signal interpolator, disposed for the respective phases, for dividing one cycle in electrical angle of a positional signal of each of the respective phases into "3n×4" cycles ("n" is an integer equal to or more than one), where the positional signal is supplied from said position detector; and
   (e) a driving waveform generator, disposed for the respective phases, for receiving a dividing address-signal from said interpolator, generating step waveforms having predetermined voltage levels (levels not more than "3n+1" steps) corresponding to respective addresses of the dividing address-signal for the three phases, and outputting the step waveforms in voltages,
   wherein respective driving signals for the respective phases—corresponding to the step waveforms for the respective phases—are applied to said power feeder, so that an alternative current changing sequentially drives the respective phase-coils.

9. The motor driver of claim 8, wherein, in said driving waveform generator, the voltage levels are divided into not more than "3n+1" steps by a voltage divider comprising resistors not more than "3n" pieces coupled in series.

10. The motor driver of claim 8, wherein, regarding respective phases, a phase difference between the positional signal and the dividing address-signal is controlled based on a phase-difference control signal supplied to said interpolator, so that a phase difference between the positional signal and the step waveform is adjustable.

11. The motor driver of claim 10, wherein the adjustable phase difference between the positional signal of each of the respective phases and the step waveform of each of the respective phases allows to adjust a phase difference between an induction voltage of said respective phase coils having given phase relations with the positional signal of the respective phases and an alternate voltage applied to said respective phase coils responsive to the step waveforms of the respective phases.

12. The motor driver of claim 10 further comprising a phase advancing controller, disposed for the respective phases, for outputting the phase-difference control signal to said interpolator, wherein the step waveform is advanced in electrical angles with the phase-difference control signal, so that the alternate current running through said coils is controlled such that a phase of the alternate current of the respective phase coils agrees with a phase of an induction voltage of said respective phase coils.

13. The motor driver of claim 10 further comprising a phase advancing controller, disposed for the respective phases, for outputting the phase-difference control signal to said interpolator, wherein the step waveform is advanced in electrical angles with the phase-difference control signal, so that the alternate current running through said coils is controlled such that a zero cross timing of the alternate current running through said respective phases coils agrees with a zero cross timing of an induction voltage of said respective phase coils.

14. The motor driver of claim 13, wherein the zero cross timing of each of the respective phases of the alternate current is detected by a common current running through a line between the dc power supply and said power feeder.

15. A fan motor including a motor driver, said motor driver comprising:
   (a) a driving coil for each of three phases
   (b) a power feeder, coupled to a dc power supply, for powering said respective phase-coils;
   (c) a position detector for detecting a position of a mover of the motor with respect to said respective phase-coils;
   (d) a positional signal interpolator, disposed in at least one of the phases, for dividing one cycle in electrical angles of a positional signal of at least one phase into "3n×4" cycles ("n" is an integer equal to or more than one), where the positional signal is supplied from said position detector; and
   (e) a driving waveform generator for receiving a dividing address-signal from said interpolator, generating step waveforms having predetermined voltage levels (levels not more than "3n+1" steps) corresponding to respective addresses of the dividing address-signal for the three phases, and outputting the step waveforms in voltages,
   wherein respective driving signals for the three phases—corresponding to the step waveforms for the three phases—are applied to said power feeder, so that an alternative current changing sequentially drives the respective phase-coils.

16. A fan motor including a motor driver, said motor driver comprising:
   (a) a driving coil for each of three phases
   (b) a power feeder, coupled to a dc power supply, for powering said respective phase-coils;
   (c) a position detector for detecting a position of a mover of the motor with respect to said respective phase-coils;
   (d) a positional signal interpolator, disposed for the respective phases, for dividing one cycle in electrical angles of a positional signal of each of the respective phases into "3n×4" cycles ("n" is an integer equal to or more than one), where the positional signal is supplied from said position detector; and
   (e) a driving waveform generator, disposed for the respective phases, for receiving a dividing address-signal from said interpolator, generating step waveforms having predetermined voltage levels (levels not more than "3n+1" steps) corresponding to respective addresses of the dividing address-signal for the three phases, and outputting the step waveforms in voltages,
   wherein respective driving signals for the respective phases—corresponding to the step waveforms for the respective phases—are applied to said power feeder, so that an alternative current changing sequentially drives the respective phase-coils.

17. An apparatus employing a fan motor having a motor driver, said motor driver comprising:
   (a) a driving coil for each of three phases
   (b) a power feeder, coupled to a dc power supply, for powering said respective phase-coils;
   (c) a position detector for detecting a position of a mover of the motor with respect to said respective phase-coils;
   (d) a positional signal interpolator, disposed in at least one of the phases, for dividing one cycle in electrical angles of a positional signal of at least one phase into "3n×4" cycles ("n" is an integer equal to or more than one), where the positional signal is supplied from said position detector; and
   (e) a driving waveform generator for receiving a dividing address-signal from said interpolator, generating step waveforms having predetermined voltage levels (levels not more than "3n+1" steps) corresponding to respective addresses of the dividing address-signal for the three phases, and outputting the step waveforms in voltages,
   wherein respective driving signals for the three phases—corresponding to the step waveforms for the three phases—are applied to said power feeder, so that an alternative current changing sequentially drives the respective phase-coils.

18. An apparatus employing a fan motor having a motor driver, said motor driver comprising:
   (a) a driving coil for each of three phases
   (b) a power feeder, coupled to a dc power supply, for powering said respective phase-coils;
   (c) a position detector for detecting a position of a mover of the motor with respect to said respective phase-coils;
   (d) a positional signal interpolator, disposed for the respective phases, for dividing one cycle in electrical angles of a positional signal of each of the respective phases into "3n×4" cycles ("n" is an integer equal to or more than one), where the positional signal is supplied from said position detector; and
   (e) a driving waveform generator, disposed for the respective phases, for receiving a dividing address-signal from said interpolator, generating step waveforms having predetermined voltage levels (levels not more than "3n+1" steps) corresponding to respective addresses of the dividing address-signal for the three phases, and outputting the step waveforms in voltages,
   wherein respective driving signals for the respective phases—corresponding to the step waveforms for the respective phases—are applied to said power feeder, so that an alternative current changing sequentially drives the respective phase-coils.

19. The apparatus of claim 17 is an air conditioner.
20. The apparatus of claim 17 is an air cleaner.
21. The apparatus of claim 17 is a water heater.
22. The apparatus of claim 18 is an air conditioner.
23. The apparatus of claim 18 is an air cleaner.
24. The apparatus of claim 18 is a water heater.

* * * * *